(12) United States Patent
Guigues

(10) Patent No.: US 11,100,650 B2
(45) Date of Patent: Aug. 24, 2021

(54) METHOD FOR FOREGROUND AND BACKGROUND DETERMINATION IN AN IMAGE

(71) Applicant: Sony Depthsensing Solutions SA/NV, Brussels (BE)

(72) Inventor: Laurent Guigues, Brussels (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 20 days.

(21) Appl. No.: 16/086,400

(22) PCT Filed: Mar. 31, 2016

(86) PCT No.: PCT/EP2016/057111
§ 371 (c)(1),
(2) Date: Sep. 19, 2018

(87) PCT Pub. No.: WO2017/167381
PCT Pub. Date: Oct. 5, 2017

(65) Prior Publication Data
US 2019/0102886 A1    Apr. 4, 2019

(51) Int. Cl.
*G06T 7/11* (2017.01)
*G06T 7/194* (2017.01)
(Continued)

(52) U.S. Cl.
CPC .............. *G06T 7/194* (2017.01); *G06F 16/55* (2019.01); *G06K 9/00355* (2013.01);
(Continued)

(58) Field of Classification Search
CPC ........... G06K 9/00147; G06K 9/00456; G06K 2209/15; G06K 9/00442; G06K 9/00449; G06K 9/34; G06K 9/346; G06K 9/4652; G06K 9/00127; G06K 9/325; G06K 9/342; G06K 9/4671; G06K 9/6232; G06K 9/00; G06K 9/36; G06K 9/40; G06K 9/32; G06K 9/46; G06K 9/62; G06K 9/623; G06N 3/0454; G06N 5/022; G06N 20/00; G06T 7/00; G06T 7/11; G06T 15/00;
(Continued)

(56) References Cited

U.S. PATENT DOCUMENTS

| | | | | |
|---|---|---|---|---|
| 2007/0122000 | A1* | 5/2007 | Venetianer | G06K 9/00771 382/103 |
| 2009/0034846 | A1* | 2/2009 | Senior | G06K 9/00778 382/190 |

(Continued)

OTHER PUBLICATIONS

International Search Report and Written Opinion for International Application No. PCT/EP2016/05711 dated Dec. 9, 2016.

(Continued)

*Primary Examiner* — Quan M Hua
(74) *Attorney, Agent, or Firm* — Wolf, Greenfield & Sacks, P.C.

(57) ABSTRACT

Described herein is a method for image processing in which a captured image is processed to provide a background image which is updated in accordance with relative movement between foreground and background in successive captured images.

20 Claims, 12 Drawing Sheets

(51) Int. Cl.

| | |
|---|---|
| *G06K 9/38* | (2006.01) |
| *G06T 7/136* | (2017.01) |
| *G06K 9/32* | (2006.01) |
| *G06K 9/00* | (2006.01) |
| *G06T 7/55* | (2017.01) |
| *G06T 7/00* | (2017.01) |
| *G06T 7/90* | (2017.01) |
| *G06F 16/55* | (2019.01) |
| *G06K 9/78* | (2006.01) |

(52) U.S. Cl.
CPC .............. *G06K 9/3233* (2013.01); *G06K 9/38* (2013.01); *G06K 9/78* (2013.01); *G06T 7/11* (2017.01); *G06T 7/136* (2017.01); *G06T 7/55* (2017.01); *G06T 7/90* (2017.01); *G06T 7/97* (2017.01)

(58) Field of Classification Search
CPC ........... G06T 7/20; G06T 7/215; G06T 7/246; G06T 7/254; G06T 7/521; G06T 7/60; G06T 7/66; G06T 7/77; G06T 15/04; G06T 15/06; G06T 15/08; G06T 15/60; G06T 15/80; G06T 7/174; G06T 7/194; G06T 7/40; G06T 7/593; G06T 7/73; G06T 9/00; G06T 15/40; G06T 17/10; G06T 19/00; G06T 19/20; G06T 5/00; G06T 5/10
See application file for complete search history.

(56) References Cited

U.S. PATENT DOCUMENTS

| | | | |
|---|---|---|---|
| 2011/0007366 A1* | 1/2011 | Sarkar | G06K 9/4638 358/462 |
| 2013/0329987 A1* | 12/2013 | Gong | G06T 7/11 382/159 |
| 2014/0232820 A1* | 8/2014 | Ha | G06T 3/40 348/43 |
| 2015/0187076 A1 | 7/2015 | Lin et al. | |
| 2016/0065930 A1* | 3/2016 | Chandra | G06T 5/30 348/46 |

OTHER PUBLICATIONS

Dickinson et al., A spatially distributed model for foreground segmentation. Image and Vision Computing. 2009;27(9):1326-35.
Langmann et al., Multi-Model Background Subtraction Using Gaussian Mixture Models. IAPRS. 2010, 6 pages.
Sen-Ching et al., Robust techniques for background subtraction in urban traffic video. Visual Communication and Image Processing. 2004;5308:881-92.

* cited by examiner

METHOD FOR FOREGROUND AND BACKGROUND DETERMINATION IN AN IMAGE

CROSS REFERENCE TO RELATED APPLICATIONS

This Application is a national stage filing under 35 U.S.C. § 371 of International Patent Application Serial No. PCT/EP2016/05711, filed Mar. 31, 2016, entitled "METHOD FOR FOREGROUND AND BACKGROUND DETERMINATION IN AN IMAGE," the entire contents of which is incorporated by reference herein.

TECHNICAL FIELD

The present disclosure generally relates to a method for image processing, and is more specifically related to the correction of errors in foreground and background determination in an image.

TECHNICAL BACKGROUND

To be fast and accurate, image processing techniques tend to require that all pixels are processed with the exclusion of pixels containing no information of interest. For example, in a fast and accurate gesture recognition method for recognising gestures performed by a human user, only pixels relating to the human user needs to be processed and the background is ignored.

Therefore, pixels of an image to be processed need to be classified into several categories. A known method for pixel classification is to compare a current image captured by a camera with a previously determined background image (or background model).

An example method for pixel classification is disclosed in the paper "Multi-Model Background Subtraction using Gaussian Mixture Models" of B. Langmann, S. Ghobadi, K. Hartmann, and O. Loffeld in Symposium on Photogrammetry Computer Vision and Image Analysis, PCV 2010, pages 61-66, 2010. In this pixel classification method, a background image is modelled by a mixture of Gaussians for each pixel.

However, known methods for pixel classification are subject to errors. Typically, if pixels have the same colour in an element of foreground as the background image, the element is not reliably detected as being part of the foreground.

In addition, the background image itself may also include errors. For example, if an object present in the scene for a period of time is removed, the background image will still contain that object even though it is no longer part of the background.

A background image can be very difficult to determine, especially when the background is more dynamic than the foreground, for example, when a camera moves around a stationary object to capture it from all angles. In this case, the background image needs to be determined using only on the most recent images of the scene, and, most of the known approaches for background modelling are not applicable.

Similar problems arise in situations where the foreground is as static as the background, for example, when a user switches on an interactive computerised system, including a camera and a display or screen, with gesture recognition capabilities and stands, motionless, in front of the camera, waiting for feedback on the screen relating to the detection of his/her body within the field of view of the camera. In this particular case, the interactive computerised system did not have any opportunity to capture a background image without the user, and the foreground, that is, the user, is almost as static as the background.

In addition, when a pixel has a value in the background image and said pixel is part of the foreground for a period of time, the background image may have changed while the pixel was in the foreground, for example, because of changing lighting conditions. When that pixel then becomes part of the background again, its value in the background image has to be updated immediately, which can be difficult with standard background image determination methods.

A common problem in image processing of stereoscopic images of a viewed scene relates to incomplete depth information, where holes are present in the constructed depth information. A stereoscopic imaging system combines at least two images, each captured from a different viewing angle of the viewed scene. The combination of the images constructs information about the depth of objects within the scene. This combination is performed by matching of the images, which requires the identification of points of interest in the images. Unfortunately, in any image, there are often zones without identifiable points of interest. No depth information can therefore be determined in relation to such zones using the construction technique. One solution is to "inpaint" the depth information in such zones, using an interpolation process based on the depth information of pixels surrounding such zones. However, this solution does not provide an appropriate result for zones surrounded by pixels having substantially different depth information, for example, if the zone having unknown depth information is the hand of a user who raises his hand in front of a wall. In this example, the pixels used to "inpaint" the depth of the hand are mostly the pixels of the wall behind the hand. As a result, the interpolated depth information of the pixels corresponding to the hand is determined to be nearer to the depth information of the wall than to the real depth information of the pixels of corresponding to the hand.

Although there exist techniques for image processing method related to the foreground and background determination in an image, there is a need for improving the technology.

SUMMARY

In accordance with one aspect of the present disclosure, there is provided a method for image processing at least one image captured by an imaging system, the method including the steps of:

a) classifying pixels of each image into one of at least two categories, each pixel including at least one of: depth information and colour information relating to said at least one image; and b) assigning pixels belonging to the same category to at least one region;

c) verifying, for each region, that the category of its pixels is correct; and d) re-classifying each incorrectly classified pixel by changing its category.

In accordance with another aspect of the present disclosure, there is provided a non-transitory computer readable medium storing a program configured to cause a computer to execute the steps of the method as described above.

In accordance with a further aspect of the present disclosure, there is provided an interactive computerised system including:

an imaging system configured to capture at least one image of a scene within its frustum;

a gesture recognition system configured to capture gestures performed by a user within the frustum of the imaging system; and a computerised system associated with the imaging system and with the gesture recognition system, the computerised system including at least one processor for processing each captured image of the scene in accordance with the steps of the method described above and configured to process captured gestures performed by a user within frustum of the imaging system.

BRIEF DESCRIPTION OF THE DRAWINGS

For a better understanding of the present disclosure, reference will now be made, by way of example, to the accompanying drawings in which.

DETAILED DESCRIPTION OF EMBODIMENTS

Figure 1:
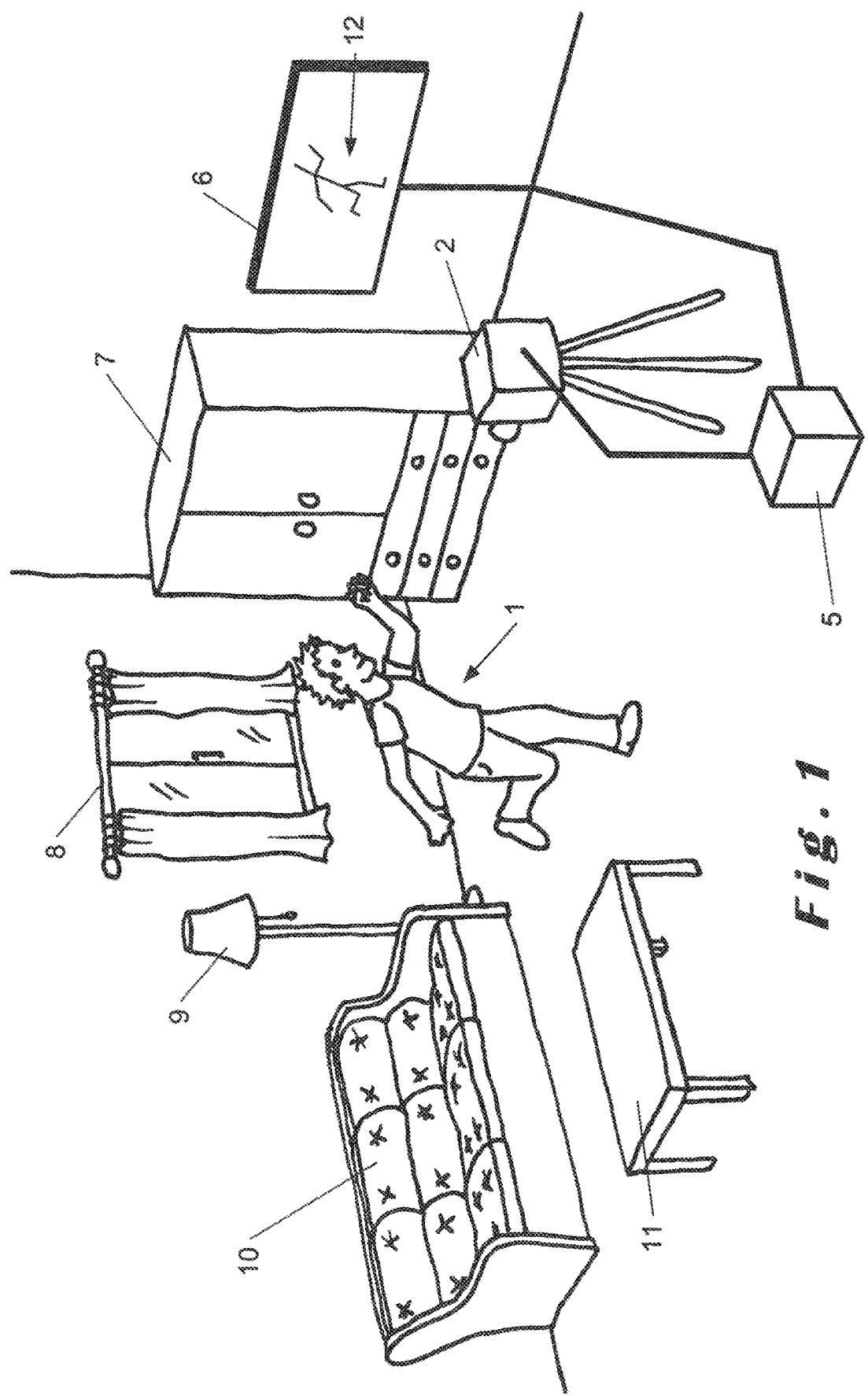
FIG. 1 illustrates a room with a human being in front of an imaging system connected to a computer that is able to carry out a method for image processing according to an embodiment of the present disclosure.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

In the following description, an element which is identical to those in other figures is referred to by the same reference numeral.

As used herein, the expression "current image" is intended to refer to an image of a scene which has been captured by an imaging system and which is currently being analyzed.

As used herein, the expression "previous image" is intended to refer to an image captured earlier than the current image by the same imaging system.

As used herein, the expression "updated image" is intended to refer to an updated version of the current image.

As used herein, the term "foreground" is intended to refer to a group of pixels that is expected to comprise information of interest.

As used herein, the expression "foreground pixel" is intended to refer to a pixel in the foreground.

As used herein, the expression "foreground region" is intended to refer to a group of foreground pixels all connected by foreground pixels.

As used herein, the term "background" is intended to refer to pixels which are not expected to comprise information of interest.

As used herein, the expression "background pixel" is intended to refer to a pixel forming part of the background.

As used herein, the expression "background region" is intended to refer to a group of background pixels which are connected to one another by way of other background pixels.

As used herein, the term "category" is intended to refer to the characteristics of the pixel as being a foreground pixel, a background pixel, or possibly a pixel of a third category, which is the category "unknown".

As used herein, the expression "category of a region" is intended to refer to the characteristics of the region of being a foreground region, a background region, or possibly a region of the unknown category.

As used herein, the expression "background and foreground regions" is intended to refer to groups of foreground regions and background regions. The background and foreground regions are the division of the current image into regions of different categories.

As used herein, the expression "preliminary background and foreground regions" is intended to refer to a first version of the background and foreground regions of the current image which is determined during a step of classification of the pixels into categories called "pixel-wise classification".

As used herein, the expression "background image" is intended to refer to a reference image which is representative of the scene without the presence of elements corresponding to the foreground.

As used herein, the expression "first background image" is intended to refer to a first version of the background image determined by a step of pixel-wise learning.

As used herein, the term "learning" is intended to refer to the assignation of a value in the background image to a pixel.

As used herein, the expression "pixel-wise learning" is intended to refer to a process by which a value of pixels within a scene are learnt on a pixel-by-pixel basis.

As used herein, the expression "pixel-wise classification" is intended to refer to a classification of pixels within a scene into categories on a pixel-by-pixel basis.

As used herein, the expression "region classification" is intended to refer to the classification (or re-classification as a re-classification is also a classification) of regions into categories on a region-by-region.

As used herein, the term "occlusion" is intended to refer to the situation where a pixel has a lower depth value (or appear to be closer to the imaging system) in a current image than in a previous image.

As used herein, the term "de-occlusion" is intended to refer to the situation where a pixel has a higher depth value (or appears to be further from the imaging system) in a current image than in a previous image.

One possible implementation of the image processing method in accordance with the present disclosure is illustrated in FIG. 1 in which a user interacts with a gesture recognition system associated with an interactive computer or computerised system. In this case, the image processing method is used for the recognition of the gestures of a human user 1 in the field of view of an imaging system 2 in order to interact with a computer 5, the computer 5 generating a visual feedback 12 for display on a screen 6 to the human user 1. The field of view of the imaging system 2 also comprises also a cupboard 7, a window 8, a lamp 9, a sofa 10 and a table 11.

The imaging system 2 can be any suitable imaging system, for example, a conventional two-dimensional still or video camera, or a three-dimensional depth camera, such as, a time-of-flight (TOF) camera. Stereoscopic imaging systems may also be used. The imaging system 2 captures image data of the scene within its field of view which is processed and used for interaction with the computer 5. Successive frames or images of the scene are captured and processed to extract information relating to the scene, a frame or an image being a two-dimensional array of pixels associated with the image plane of the imaging system 2. Each pixel therefore corresponds to a location in a two-dimensional image as perceived by the imaging system 2. Each pixel may comprise at least one value relating to information in the scene captured by the imaging system 2.

As used herein, the expression "the value of a pixel" is intended to refer to at least one number which provides information about a pixel. The value of a pixel may be different from one image to another. Values of a pixel may relate to colour, for example, black-and-white, grayscale, full colour using an red/green/blue (RGB) colour model based on at least the visible portion of the electromagnetic spectrum, depth, that is, the distance between the imaging system 2 and an object in the scene which corresponds to the pixel in the image, as well as combinations of colour and depth. Other information may also be associated with each pixel.

The pixels of the image may contain only partial information. It be the case that one pixel may contain information relating to both colour and depth, while pixel may only contain information about colour with no depth information. This may occur if the imaging system 2 does not capture all expected information for each pixel. Where the imaging system comprises a stereoscopic imaging system, the matching of the images to construct depth values for each point in the scene may not always provide a value, resulting in pixels with no depth information.

The computer 5 processes at least one image captured by the imaging system 2 to determine foreground and background regions within the scene, foreground regions typically corresponding to objects of interest which may be used for gesture recognition, and, background regions corresponding to pixels which are not associated with objects of interest. In the specific case illustrated in FIG. 1, the foreground comprises the pixels corresponding to the human user 1 which are processed for gesture recognition so that the human user 1 can interact with the computer 5 without the need for additional devices. In another situation, a first human user corresponds to a first foreground region, a second human user corresponds to a second foreground region, and both foreground regions together are considered to form the foreground. The cupboard 7, the window 8, the lamp 9, the sofa 10 and the table 11, in the case of FIG. 1, form part of the background.

In FIG. 1, processing of a series of images in a video sequence captured by the imaging system 2 by the computer 5 results in a visual sequence 12 which is displayed on the display or screen 6 connected to the computer 5 to provide visual feedback to the human user 1 in a suitable form. The computer 5 performs gesture recognition for interpreting gestures of the human user 1, which makes possible for the human user 1 to interact naturally with the computer 5 without mechanical devices.

The results of image processing by the computer 5 may also be used for other applications, for example, when the computer is connected to a printer, the results of the image processing may be used to determine what is sent to the printer for printing.

In FIG. 1, the imaging system 2 is located at a substantially fixed location and a large part of at least the background and possibly the foreground remains the same between two successive images. It will readily be appreciated that the imaging system 2 may move with respect to the scene from frame to frame, and the background and the foreground need to be re-evaluated for each image or frame.

Figure 2:
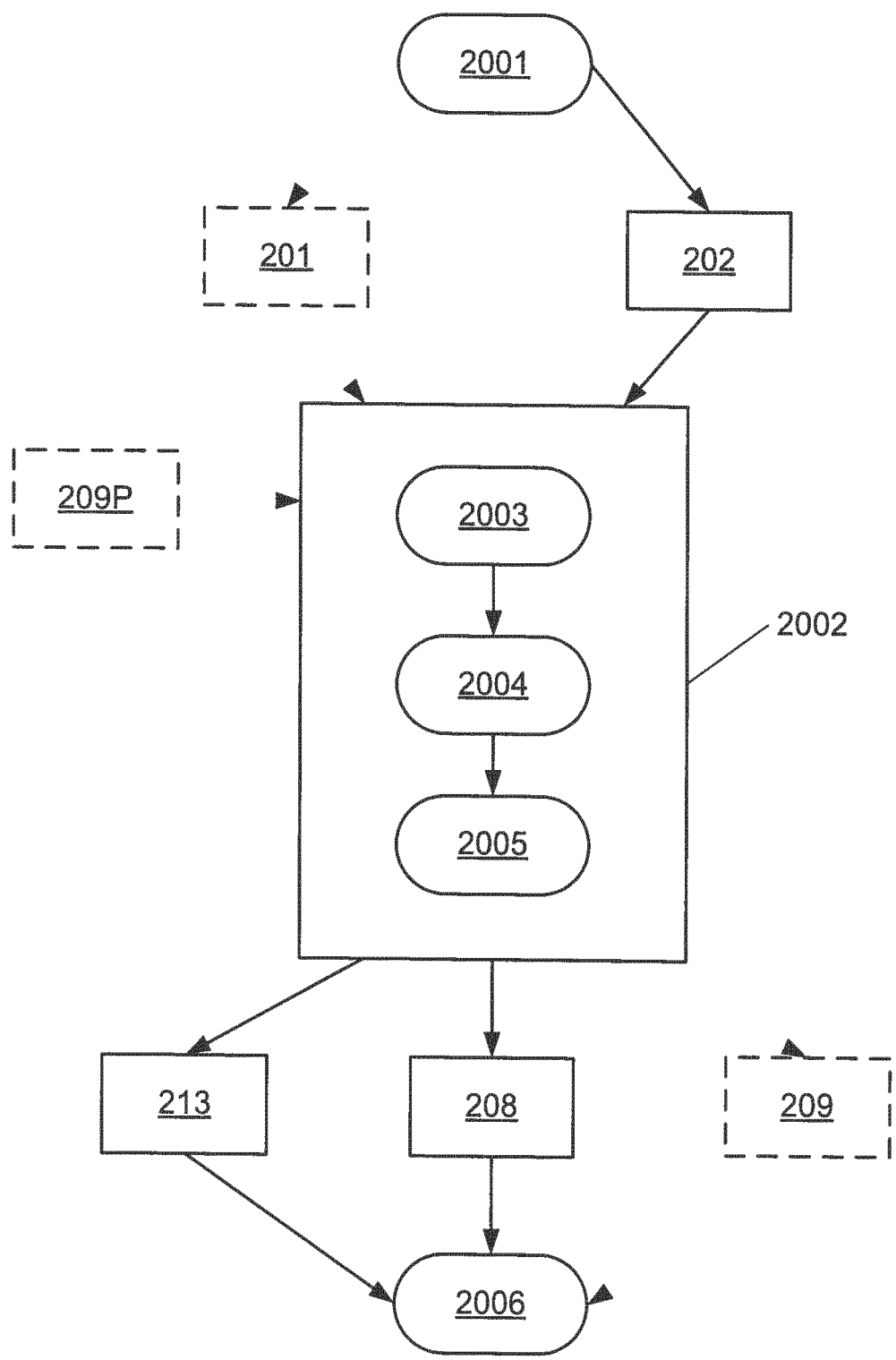
FIG. 2 illustrates a flowchart of a method for image processing.

FIG. 2 illustrates the steps of an image processing method according to an embodiment of the present disclosure for a sequence of images captured by the imaging system 2 (step 2001). From step 2001, a current image 202 of a scene is selected and analysed in an analysing step (step 2002). A previously selected and analysed image (referred to as "previous image" hereinafter) 201 of the same scene may be used as another input for step 2002. A previously determined background image 209P (referred to as "previous background image" hereinafter) may be used as another input for step 2002. Step 2002 comprises three sub-steps, namely: an image pre-processing step (step 2003), an image core processing step (step 2004), and an image post-processing step (step 2005).

Step 2002 generates an updated image 213, that is, an updated version of the current image 202, updated background and foreground regions 208 of the current image, and, optionally, an updated background image 209 of the scene. The updated image 213 and the updated background and foreground regions 208 of the current image, as well as the updated background image 209 of the scene, if present, are then used as input for further image processing as indicated at step 2006.

Although the current image 202 is normally the most recent image of the scene, it may be any captured image chosen for processing. Similarly, the previous image 201 is normally the previously captured image to the current image 202, but it may be any image captured before the image that is being processed as the current image.

The image pre-processing (step 2003), core processing (step 2004) and post-processing (step 2005) are described in more detail below. Even if it is preferred that the sub-steps of image pre-processing, core processing and post-processing are performed sequentially, it is possible to implement only one of the sub-steps during the analysing step 2002 for the current image 202, for example, the image pre-processing (step 2003), the core processing step (step 2004) or the image post-processing step (step 2005).

The updated image 213 is a version of the current image 202 prepared for further image processing in step 2006. The updated background and foreground regions 208 of the current image are a segmentation of the current image 208 into regions categorised as being foreground and background. The background and foreground regions 208 comprise data about the categories of the pixels of the current image 208. In addition, there may be regions which are classified as being "unknown" and which belong to neither foreground or background.

The background image 209 is a reference image in which all pixel values relate to pixels which would be present in the absence of any foreground elements. In the background regions, the pixel values in the background image 209 are equal to the pixel values in the current image 202. The background image may be refined over time, along with the succession of images captured by the imaging system as will be described with reference to FIG. 3.

The further image processing step (step 2006) is performed by the computer 5. The foreground regions determined by the analysing step (step 2002) are the parts of the updated image 213 that will be mainly used for the further analysis, for example, for point of interest determination or gesture recognition. The background image 209 may be used for the processing of subsequent images to determine the background and foreground regions in those images.

Figure 3:
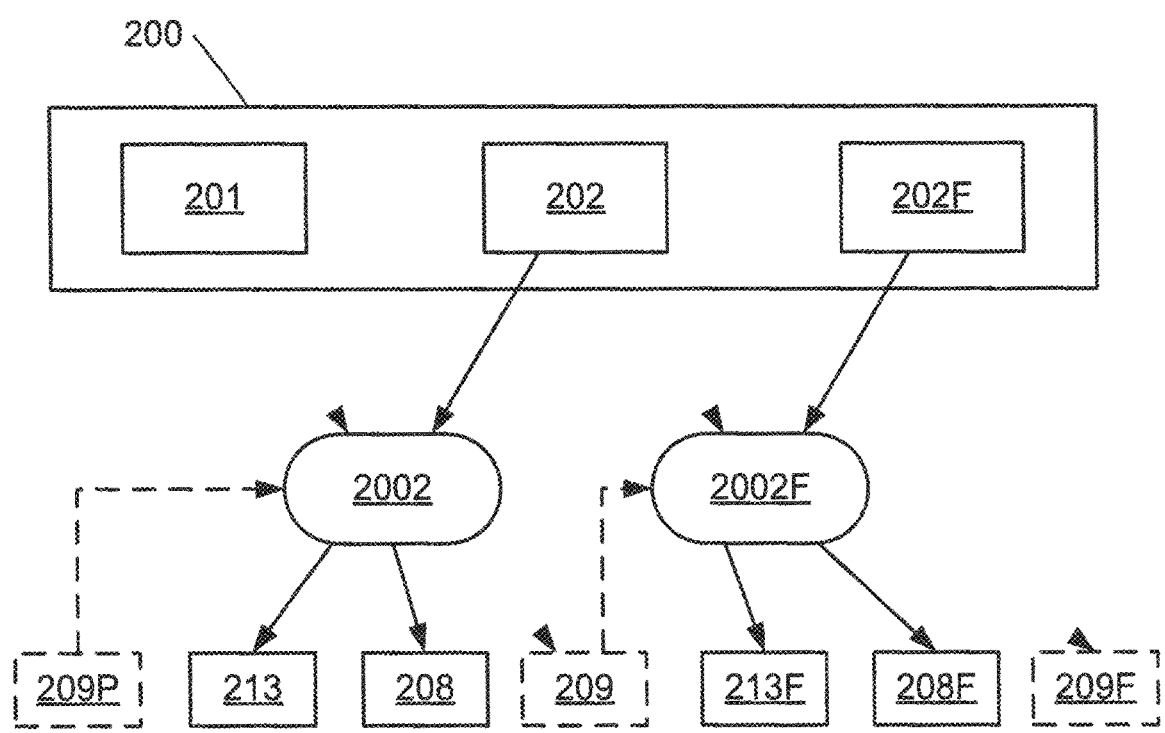
FIG. 3 illustrates a flowchart of a method for image processing according to an embodiment of the present disclosure.

FIG. 3 illustrates the sequence of image processing along with a video sequence 200. The video sequence 200 is a succession of captured images 201, 202, 202F, etc., in which image 202 corresponds to the current image, image 201 corresponds to a previous image, and image 202F (referred to as the "following image") corresponds to a subsequent (or following) image with respect to the current image when captured by the imaging system.

The analysing step 2002 is applied to the current image 202 and optionally uses as inputs the previous image 201 and a background image 209P which was generated by an analysing step (not shown) applied to the previous image 201. Naturally, the method described herein may also be applied to image 202F. The analysing step 2002 generates the updated image 213, the updated background and foreground regions 208, and optionally, the background image 209 which correspond to the current image 202. An analysing step 2002F, which is applied to the subsequent (or following) image 202F, optionally uses as inputs the background image 209 generated by the analysing step 2002 and the current image 202. The analysing step 2002F generates an updated image 213F relating to the subsequent (or following) image 202F, updated background and foreground regions 208F, and optionally, an updated background image 209F.

The background image may thus be refined along with the video sequence so that some of the pixels of the background image are either maintained or updated by an analysing step. This is of particular use when the imaging system is substantially immobile between two successive images, but less so when the imaging system is mobile with respect to the scene between two successive images.

In an embodiment of the present disclosure, the image pre-processing sub-step 2003 includes a step of determining a first background image 204 by a pixel-wise learning process (step 2007) applied to each pixel, pixel-by-pixel, as described below with reference to FIG. 4. The background image 204 is called "first" at this stage because it may be updated later, during the image core processing (step 2004 in FIG. 2), to become the background image 209, which is an optional output of the analysing step 2002.

Figure 4:
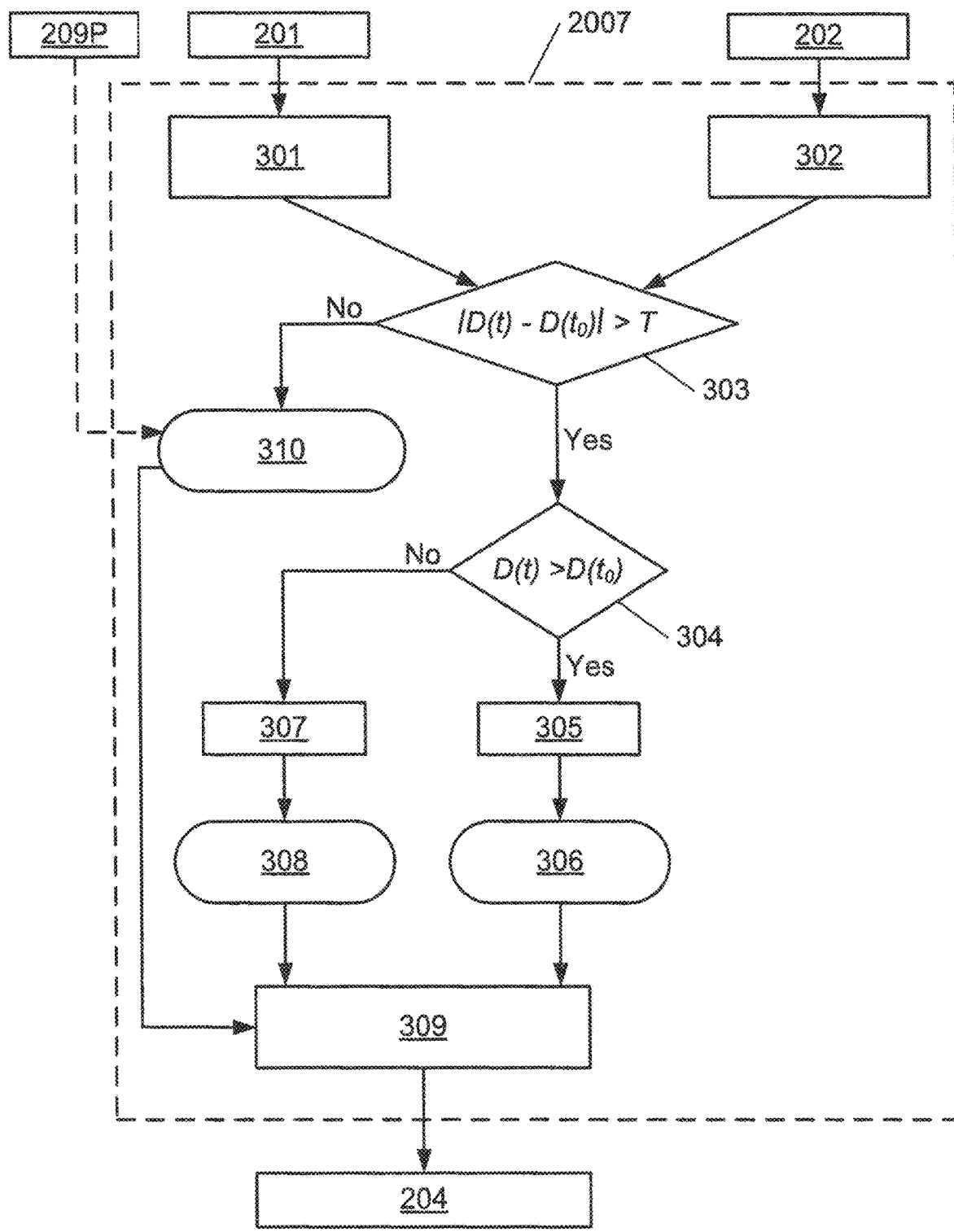
FIG. 4 illustrates a flowchart of a method for image processing according to an embodiment of the present disclosure.

In FIG. 4, a flow chart is shown which illustrates the steps for creating the first background image 204 from inputs of a current image 202, a previous image 210, and optionally, a previous background image 209P, the first background image 204 being the output from step 2007. From the current and previous images 202, 201 respectively, each pixel is selected and processed as described below.

A given pixel has a value 301 in the previous image 201 which includes at least a depth value, $D(t_0)$, corresponding to that pixel in the previous image 201. This same pixel has also a value 302 in the current image 202 indicating at least a depth value, $D(t)$, corresponding to that pixel in the current image 202. In a first test step, step 303, an absolute value of the difference in depth values between the previous image 201 and the current image 202 is tested to determine if it is above a predetermined threshold, T:

$$|D(t)-D(t_0)|>T$$

In an embodiment of the present disclosure, the threshold depends on the noise level on the measured depth, which itself depends on the characteristics of the imaging system and on the depth itself. The threshold can be determined from a model that takes into account at least one of the noise level on the measured depth, the characteristics of the imaging system and the depth.

If the absolute difference in depth values between the previous image 201 and the current image 202 is higher than the predetermined threshold, in a second test step, step 304, the depth value for the pixel in question in the current image $D(t)$ is compared with the depth of the same pixel in the previous image $D(t_0)$.

If the depth value for the pixel in the current image is higher than if the depth value for the pixel in the previous image, that is, $D(t)>D(t_0)$, it indicates a de-occlusion 305 at that pixel. In that case, the value 302 of the pixel in the current image 202 is "learnt" for that pixel at step 306. This means that the value 309 assigned to that pixel in the first background image 204 is set to the value 302 of that pixel in the current image 202.

If the depth value for the pixel in the current image, $D(t)$, is not higher than if the value of said pixel in the previous image $D(t_0)$, that is, $D(t)<D(t_0)$, it indicates an occlusion 307 is present at the pixel in the current image 202. In that case, the value 301 of said pixel in the previous image 201 is "learnt" for the pixel at step 308. This means that the value 309 of the pixel in the first background image 204 is set to the value 301 of that pixel in the previous image 201.

In both steps 303 and 304 described above, only a valid depth value can be used for the comparison between the current image and the previous image. The term "valid" as used herein is intended to mean that the pixel in either the previous image or the current image has a depth value which can be used for processing.

At the end of the pixel-wise learning step for a pixel, step 2007, the value 309 assigned to that pixel in the first background image 204 can only be determined if the absolute difference between the depth values 302, 303 of respective ones of the current image and the previous image is above the threshold (step 303). If the absolute difference between the depth values is not higher than the threshold, at step 310, the value of the pixel in the first background image 204 is set to the value of the corresponding pixel in the previous background image 209P if such a previous background image 209P was determined based on a previous image of the video sequence 200 (FIG. 3). If no previous background image 209P has previously been determined, the value of the corresponding pixel in the current image is considered to be "undetermined" or unknown. The term "corresponding pixel" as used herein refers to a pixel which has the same position within two or more images, that is, the same position in an image plane of the imaging system used to capture the two or more images.

If a pixel has no valid depth value in the previous image 201, in the current image 202 or in both, the value of the pixel in the first background image 204 is set equal to the value of said pixel in the previous background image 209P, if such a previous background image 209P has been determined. If no previous background image 209P has been determined, the value of said pixel is considered to be "undetermined" or unknown.

The pixel-wise learning step 2007 is normally performed for each pixel in the image, but may be carried out only on a part of the current image 202 and a corresponding part of the previous image 201. The learnt values 309 of the pixels are then combined in the first background image 204.

Since the determination of the first background image 204 by the pixel-wise learning 2007 as described above with reference to FIG. 4 requires only two images, the method can also be applied where the background is changing rapidly, for example, when there is relative movement between the imaging system or camera with respect an object of interest. The determination of the first background image 204 using pixel-wise learning is therefore a real-time dynamic background learning method.

Figure 5:
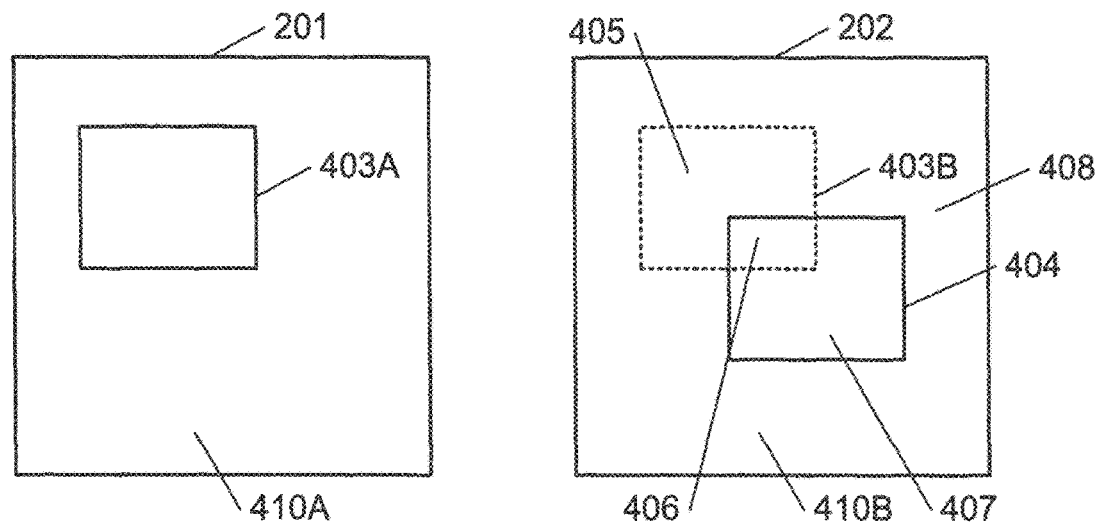
FIG. 5 illustrates a pixel-wise learning according to an embodiment of the present disclosure.

FIG. 5 gives an example of pixel-wise learning 2007 as described above with reference to FIG. 4. The previous image 201 is shown in the left-hand image and includes an object 403A (shown as a rectangular box for ease of explanation) which has a lower depth value than the remainder 410A of the image, that is, it is closer to the imaging system or camera. The current image 202 is shown in the right-hand image and shows that the object has moved between the capture of the two images. The current image 202 includes an object 404 which has a lower depth value than the remainder 410B of the image. For ease of explanation, the position of the object in the previous image is also indicated, at 403B, in the current image 202.

The pixel-wise learning step 2007 (FIG. 4) finds a de-occlusion for pixels in area 405. A de-occlusion at a pixel suggests that an object that was present at that pixel in the previous image 201 is no longer present at that pixel in the current image 202, and there is a high chance that that pixel in the current image 202 is part of the background. This results in the values corresponding to pixels in the area 405 of the current image 202 being learnt in the first background image 204 (FIG. 4).

The pixel-wise learning step 2007 also finds an occlusion for pixels of area 407. An occlusion at a pixel suggests that an object not previously present at that pixel in the previous image 201 is now present at that pixel in the current image 202, and there is a high chance that that pixel in the previous image 201 is part of the background. This results in the values corresponding to pixels in the area 406 being learnt in the first background image 204 (FIG. 4). Values of pixels in areas 407 and 408 of the current image 202 are either obtained from a previously determined background image 209P or undetermined or unknown because no occlusion or de-occlusion occurred when comparing pixels in the current image 202 with corresponding pixels in the previous image 201.

Although a specific pixel-wise learning process is described above for the image pre-processing step 2003 (FIG. 2), other image pre-processing techniques may be used including techniques to determine an first background image to prepare the current image for the core processing sub-step 2004 (FIG. 2) or both. It is also possible, according to an embodiment of the present disclosure, to skip the image pre-processing sub-step 2003 altogether as mentioned above.

After the image pre-processing sub-step 2003, the current image 202, and optionally, the previous image 201 and the first background image 204 are used in the image core processing sub-step 2004. A flow chart illustrating steps of the image core processing subs-step 2004 according to an embodiment of the disclosure is shown in FIG. 6.

Figure 6:
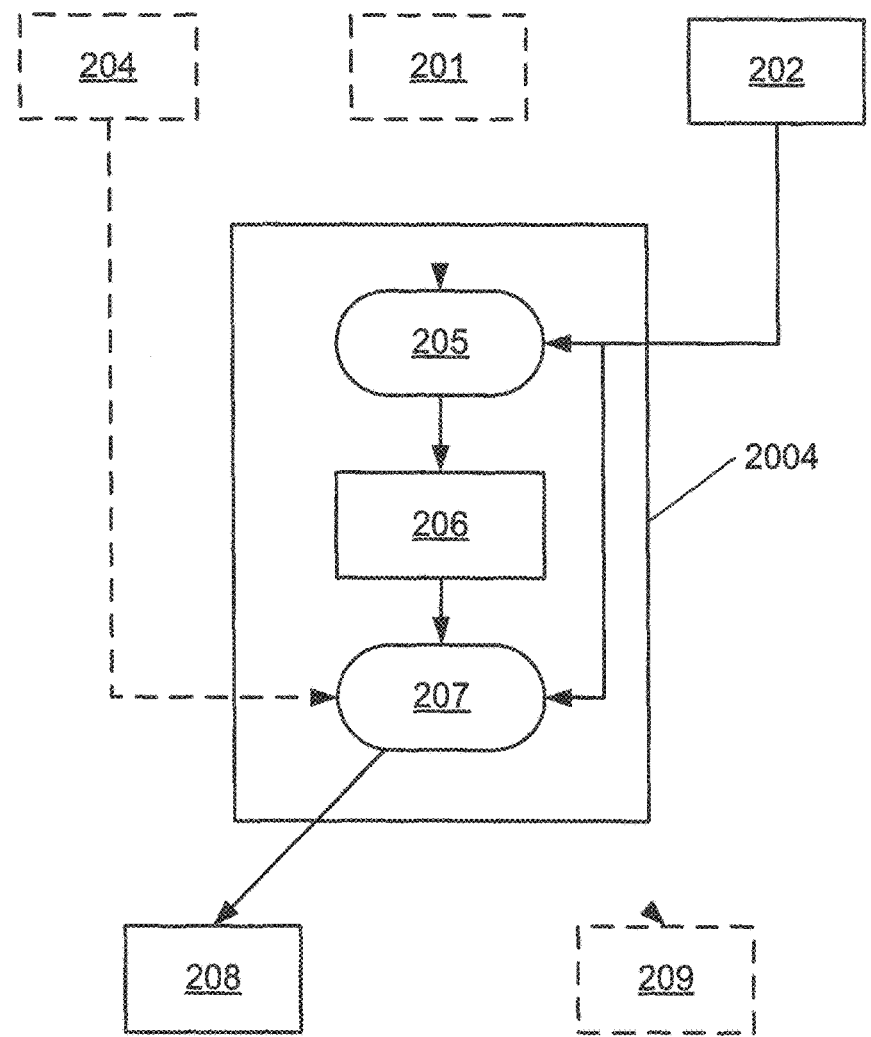
FIG. 6 illustrates a flowchart of a method for image processing according to an embodiment of the present disclosure.

As shown in FIG. 6, the image core processing sub-step 2004 includes a pixel-wise classification step 205 which generates preliminary background and foreground regions 206. The background and foreground regions 206 are called "preliminary" at this stage because they will be updated during a subsequent region classification step 207 to become the background and foreground regions 208 forming an output of the image core processing step 2004. The region classification step 207 may also generate the background image 209 of the scene.

This pixel-wise classification step 205 classifies the pixels in the current image into one of several categories. The categories typically include at least foreground and background pixels, with the possibility of having an unknown category for pixels for which it is not possible to categorise as being either foreground or background. Naturally, other categories are also possible. Several methods of pixel-wise classification are possible, which use, or not, the previous image 201 and/or the first background image 204 as inputs.

Pixels are grouped according to their category and their position into preliminary background and foreground regions 206 corresponding to the current image 202. Pixels of one category which are all connected to one another are considered to form a region of that category.

The region classification step 207 is a corrective step with, first a verification of the category of each region in the preliminary background and foreground regions 206, and then a re-classification, that is, a change of category if the region was erroneously classified. The region classification step 207 requires the current image 202 and the preliminary background and foreground regions 206 as inputs, with an optional input of the first background image 204. The background and foreground regions 208 include the corrections made on the preliminary background and foreground regions 206 by the region classification step 207. The first background image 204 may also be corrected by the region classification step 207, and thus becomes the background image 209.

The pixel-wise classification step 205 according to an embodiment of the present disclosure is similar to the pixel-wise learning step 2007 described with reference to FIG. 4 above. The pixel-wise classification is applied to each pixel, pixel-by-pixel as described below with reference to FIG. 7. As described above, each pixel has a value 301 including depth in the previous image 201, and a value 302 including depth in the current image 202. The steps 303 and 304 as described above with reference to FIG. 4 are effectively the same and are not described again in detail here.

The result of the comparison between the depth values of the previous image and the current image at step 304 determines whether there is de-occlusion or occlusion as described above and classifies the pixel as being either background or foreground in accordance with the comparison. If there is a de-occlusion 305, the pixel is classified as background 6001. If there is occlusion 307, the pixel is classified as foreground 6002. If the absolute difference in depth values between the previous image 201 and the current image 202 is not higher than the threshold, the pixel is classified as unknown as indicated at 6003.

The pixel-wise classification step 205 may be performed for each pixel in the current image 202, but, as an alternative, may be performed only on a part of the current image 202. If the pixel-wise learning step 2007 described above with reference to FIG. 4 is performed during the image pre-processing step 2003, information relating to whether or not a pixel has been subjected to de-occlusion and/or occlusion can be stored between the pixel-wise learning step 2007 and the pixel-wise classification step 205 and subsequently used to classify directly pixels as being foreground 6002 (occlusion 307), background 6001 (de-occlusion 305) and unknown 6003 (no occlusion or de-occlusion).

It is also possible to group the pixel-wise learning step 2007 and the pixel-wise classification step 205 in a single step where:

in case of occlusion 307, the value of the pixel in the previous image 201 is learnt and the pixel is classified as foreground at 6002;

in case of de-occlusion 305, the value of the pixel in the current image 202 is learnt and the pixel is classified as background 6001; and in case where no occlusion or de-occlusion is determined, the value of the pixel in the first background image is obtained from a previously determined background image 209P, or, if there is no previously determined background image, the value of the pixel is undetermined and its category is considered to be unknown 6003.

In case where a pixel has no valid depth value in the current image 202 or in the previous image 201, that pixel is classified as unknown.

Pixels are then grouped according to their category and their position into preliminary background and foreground regions 206 corresponding to the current image 202.

Known methods of pixel-wise classification (step 205) can also be used to determine the preliminary background and foreground regions 206 corresponding to the current image 202. For example, a depth map can be used to determine the category of the pixels. It is also possible to consider that all pixels with a depth higher than or equal to a background threshold are classified in the background category, all pixels with a depth lower than or equal to a foreground threshold, which is lower than the background threshold, are classified in the foreground category, and all pixels with a depth between the background threshold and the foreground threshold are classified in an "unknown" category.

Figure 7:
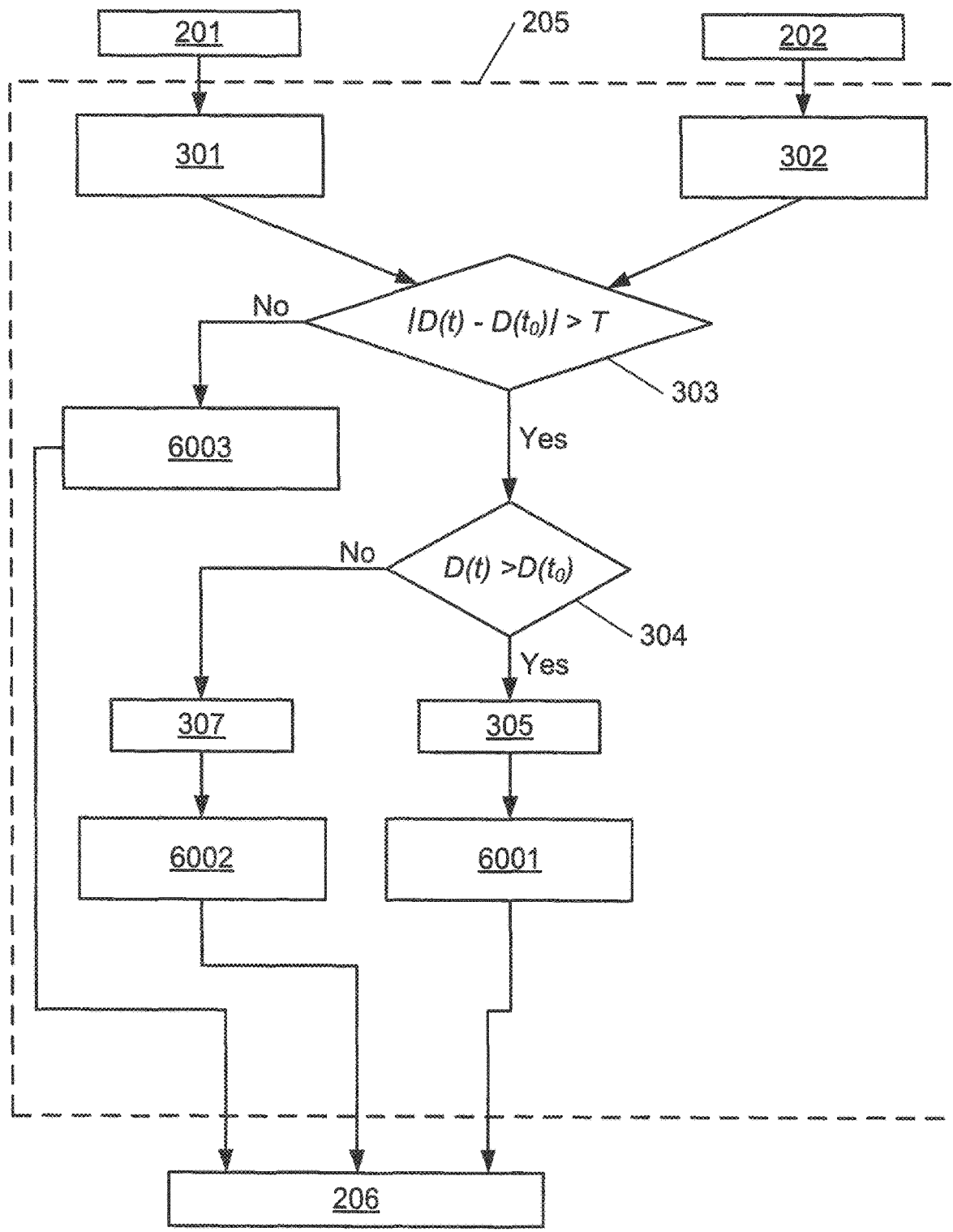
FIG. 7 illustrates a flowchart of a method for image processing according to an embodiment of the present disclosure.
Figure 8:
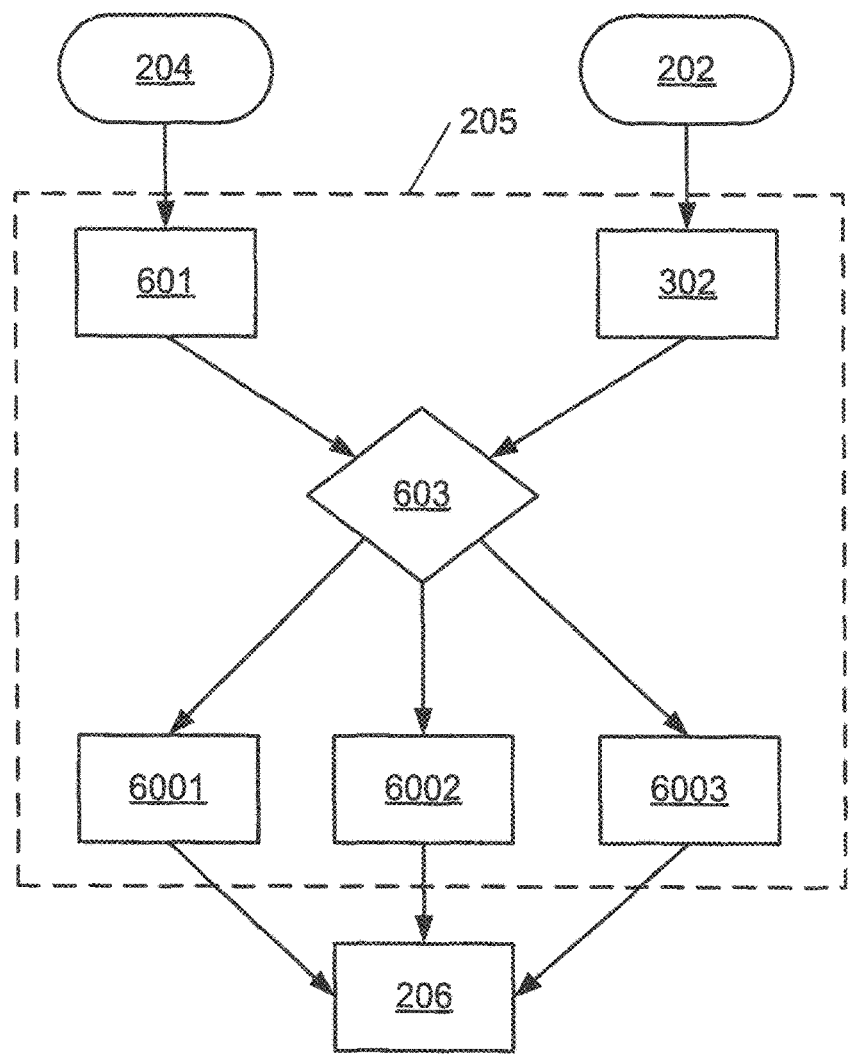
FIG. 8 illustrates a flowchart of a method for image processing.

If a first background image 204 is at least partially known before the pixel-wise classification, the pixel-wise classification step 205 can be performed on each pixel, pixel-by-pixel, as illustrated in FIG. 8. FIG. 8 illustrates a flow chart for the generation of the preliminary background and foreground regions 206 in the pixel-wise classification step 205 that is an alternative to FIG. 7. The first background image 204, which may be been generated as described above with reference to FIG. 4, is compared with a current image 202. A value 601 of a pixel in the first background image 204 is compared, at step 603, with a value 302 of a corresponding pixel in the current image 202 to determine if the values 601 and 302 of said pixel are close to one another. The criteria for this comparison can be a similarity of colour, depth or both in the values 601 and 302 of the pixel. Other criteria may also be used.

If the values 601 and 302 of the pixel are considered to be close to one another, for example, by being within a predefined range or threshold, the pixel is classified as being a background pixel 6001. If the values 601 and 302 of said pixel are considered to be remote from one another, for example, by being outside the predefined range or threshold, the pixel is classified as a foreground pixel 6002. If the values 601 and 302 of the pixel are considered to be too close to be a foreground pixel with a high confidence but too remote to be a background pixel with a high confidence, the pixel is classified as an unknown pixel 6003. If the value of the pixel was undetermined in the first background image 204, the pixel is classified as an unknown pixel 6003.

Pixels are then grouped according to their category and their position into preliminary background and foreground regions 206 corresponding to the current image 202.

Figure 9:
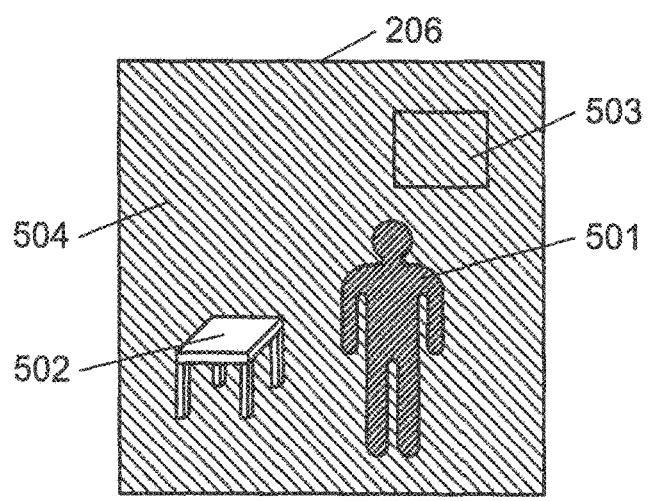
FIG. 9 illustrates a pixel-wise classification according to an embodiment of the present disclosure.

FIG. 9 illustrates an example of preliminary background and foreground regions 206 corresponding to the current image 202. The pixels of user 501 are classified as foreground pixels because his/her distance to the imaging system is shorter than a first threshold. The pixels of the window 503 and the wall 504 which are classified as background because his/her distance to the imaging system is higher than a second threshold. The pixels of the table 502 are classified as unknown pixels because they cannot be considered to be foreground or background with a high degree of confidence because the distance between the table and the imaging system is above the first threshold and below the second threshold.

As a next step in the core processing step 2004 of the image, starting from the preliminary background and foreground regions 206 (determined as illustrated in FIG. 7 or another method like that illustrated in FIG. 8) and the current image 202, the region classification step 207 is applied in order to correct, where appropriate, the background and foreground regions of the current image 202 by re-classifying regions which have erroneously been classified. The region classification step 207 according to an embodiment of the present disclosure introduces a correction mechanism which can be used to correct errors present at this stage in the category of the regions of the current image.

Figure 10:
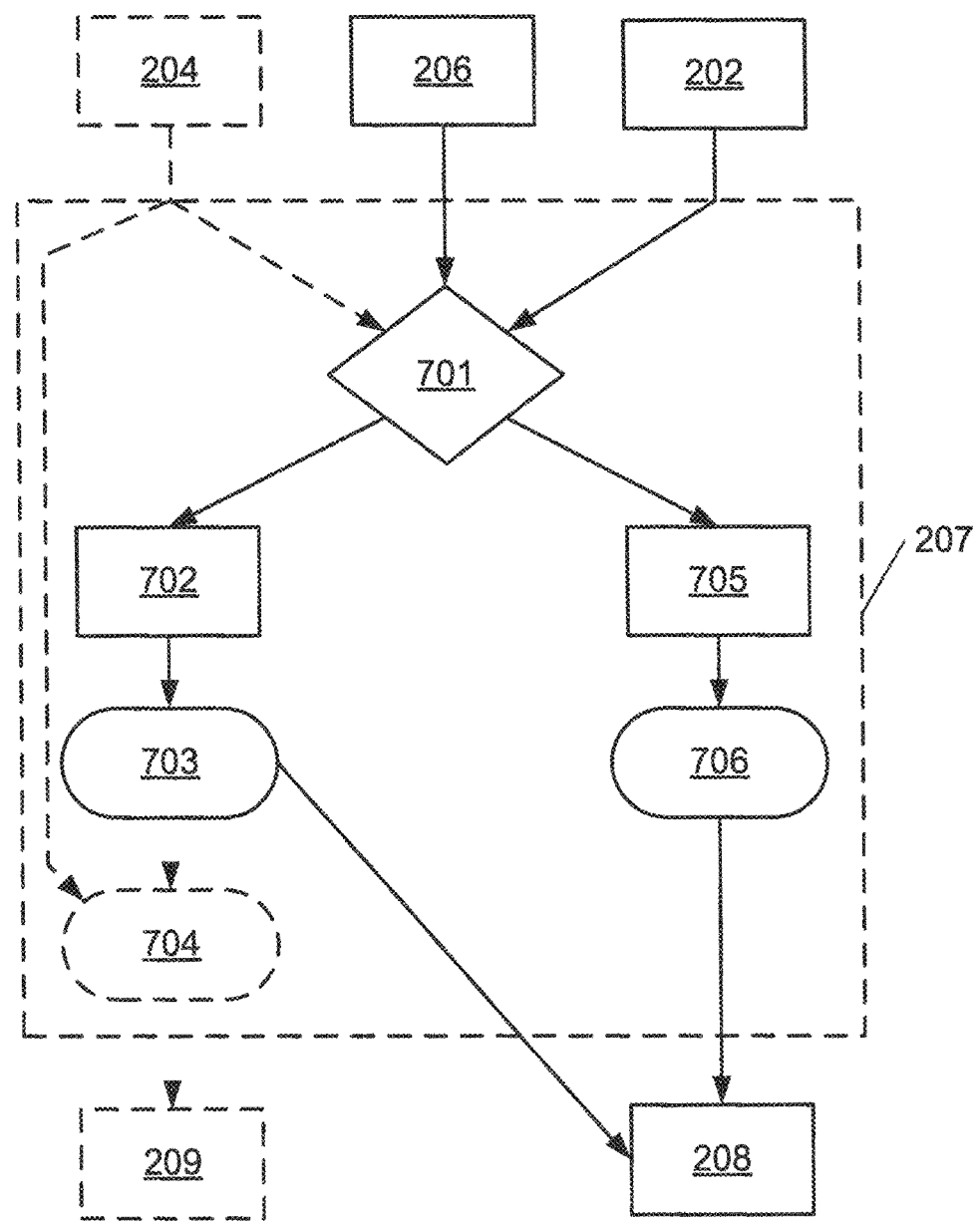
FIG. 10 illustrates a flowchart of a method for image processing according to an embodiment of the present disclosure.

In FIG. 10, a flowchart is shown which illustrates the step of region classification 207 according to an embodiment of the present disclosure. The region classification step 207 uses the preliminary background and foreground regions 206, the current image 202 and, optionally, the first background image 204, and generates the background and foreground regions 208, which are an updated version of the preliminary background and foreground regions 206, and optionally an updated background image 209.

First, a check is performed (step 701 as described in more detail with respect to FIG. 11) on each region of the initial background and foreground regions 206 to determine if the categorisation of pixels in this region is correct.

If check (step 701) detects that the category of the pixels in this region is not correct, the region is considered as a "ghost" region 702, that is, a region which is in an incorrect category. A re-classification or category change (step 703) is applied to all pixels in the identified "ghost" regions 702 to update their category. Optionally, the re-classification step 703 may be followed by an update of the values in the background image of the pixels of the ghost regions 702 (step 704). With the update step 704, the first background image 204 becomes the background image 209.

If the check (step 701) detects that the category of the pixels in this region is correct, the region maintains its classification and is considered as not being a "ghost" region 705, that is, the region has correctly been assigned as being either a foreground region or a background region. The category of the pixels of all other regions remains the same (step 706).

The background and foreground regions 208 are the preliminary background and foreground regions 206 where the "ghost" regions 702 have been re-classified by the re-classification step 703 and all other regions maintain their categorisation (step 706).

Flowcharts of these embodiments of the check (called steps 701a, 701b, 701c and 701d) are illustrated in respective ones of FIGS. 11a to 11d. The check (step 701) determines if a region 1001 of the preliminary background and foreground regions 206 is a "ghost" region (output 702) or is not a "ghost" region (output 705). The four embodiments are based on the determination that a region is a "ghost" region if it corresponds to no real object in the current image 202, but does correspond to a feature in the first background image 204 if such a background image 204 is available.

In each embodiment of the check, the regions of the preliminary background and foreground regions 206 are considered one-by-one. The flowcharts of FIGS. 11a to 11d considers a particular region 1001 of the preliminary background and foreground regions 206 and the edge 1002 thereof (or at least part of such an edge).

Figure 11B:
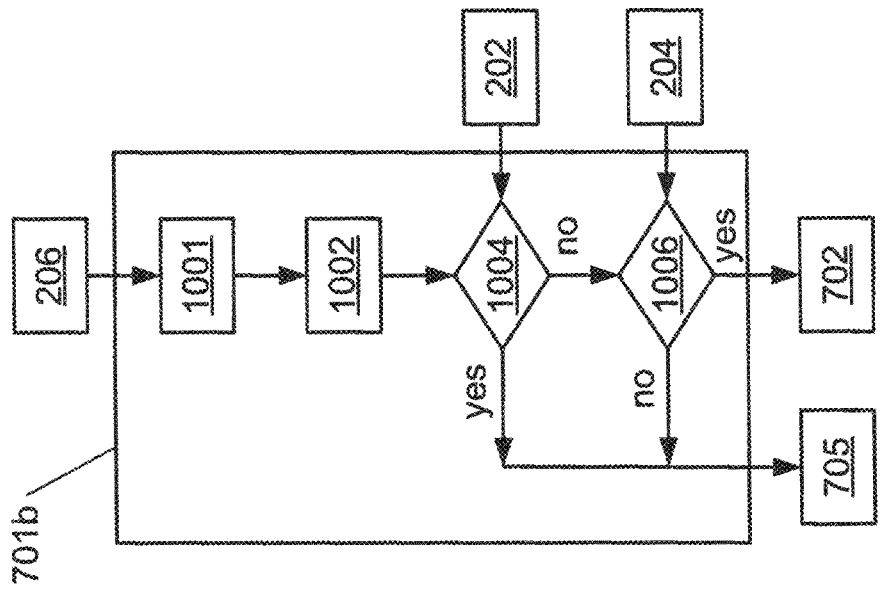
FIGS. 11a to 11d respectively illustrate flowcharts for different embodiments for performing the method shown in FIG. 10.
Figure 11A:
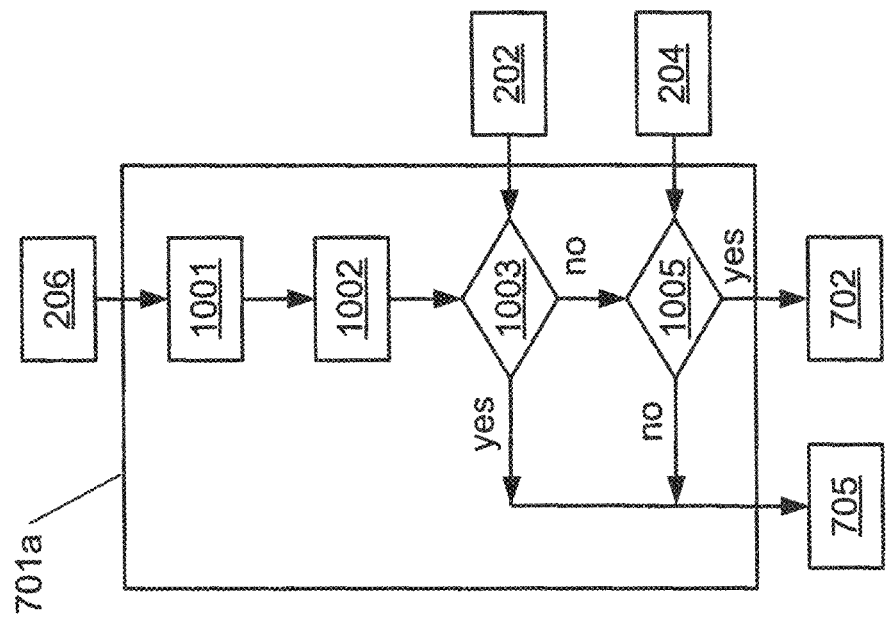

In a first embodiment of the check (step 701a) as shown in FIG. 11a, it is preferred that it is used if the value of a pixel in the current image 202 comprises an indication of the depth value of the pixel and no indication of the colour thereof, or if it is preferred to use the depth information only. Step 1003 determines if a depth boundary appears in the current image 202 at the position of the edge 1002. This check can be performed by computing the difference in depth values between pixels across the boundary in the current image 202. If the difference in depth values is higher than a predetermined threshold for substantially all pixels along the edge 1002, or for a predetermined percentage of the pixels thereof, it is considered that a depth boundary appears in the current image 202 at the position of the edge 1002. Then region 1001 is not a "ghost" region 705 as it is present in the current image 202.

Otherwise, a further step 1005 is performed to determine if a depth boundary appears in the first background image 204 at the position of the edge 1002. This step 1005 can be performed by computing the difference in depth values between pixels across the boundary in the first background image 204. If the difference in depth values is higher than a threshold for substantially all pixels of the edge 1002 or for a predetermined percentage of the pixels of the edge 1002, a depth boundary appears in the first background image 204 at the position of the edge 1002. In this case, the region 1001 is a "ghost" region 702 because it is not present in the current image 202 but is present in the first background image 204.

If the check (step 1005) does not provide a difference in depth values which is higher than the threshold, if no first background image 204 is available, or if the first background image 204 has no reliable depth information at the position of the edge 1002, the region 1001 not to be a "ghost" region 705.

In a second embodiment of the check (step 701b) as shown in FIG. 11b, it is preferred that the check is used if the value of a pixel in the current image 202 comprises an indication of the colour of the pixel and no indication of the depth thereof, or if it is preferred to use the colour information only. Step 1004 determines if a colour boundary appears in the current image 202 at the position of the edge 1002. This step 1004 can be performed by computing the difference in colour between pixels across the boundary in the current image 202. The computed difference in colour can be computed as a delta E, or, if pixels have black-and-white colour, the computed difference in colour can be 0 if pixels across the boundary are all black or all white. If the difference in colour values is higher than a predetermined threshold for substantially all pixels along the edge 1002, or for a predetermined percentage of the pixels thereof, it is considered that a colour boundary appears in the current image 202 at the position of the edge 1002. Then region 1001 is not a "ghost" region 705 as it is present in the current image 202.

Otherwise, a further step 1006 is performed to determine if a colour boundary appears in the first background image 204 at the position of the edge 1002. This step 1006 can be performed by computing the difference in colour values between pixels across the boundary in the first background image 204. If the difference in colour values is higher than a threshold for substantially all pixels of the edge 1002 or for a predetermined percentage of the pixels of the edge 1002, a colour boundary appears in the first background image 204 at the position of the edge 1002. In this case, the region 1001 is a "ghost" region 702 because it is not present in the current image 202 but in the first background image 204. If the check (step 1006) does not provide a difference in colour values which is higher than the threshold, if no first background image 204 is available, or if the first background image 204 has no reliable colour information at the position of the edge 1002, the region 1001 is not a "ghost" region 705.

Figure 11D:
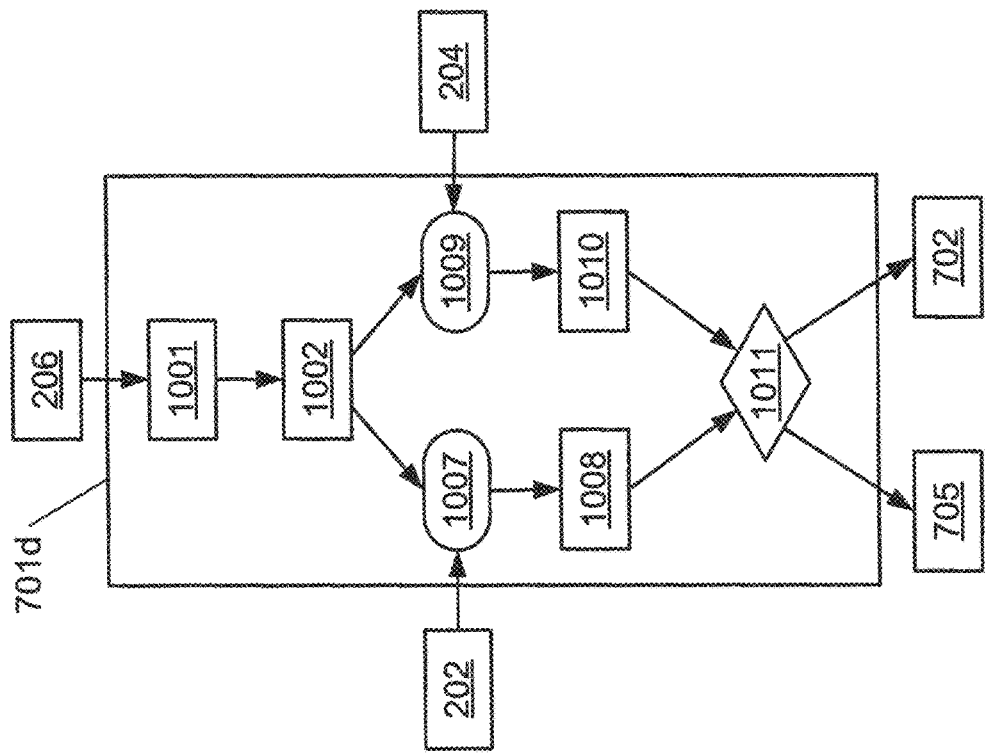
Figure 11C:
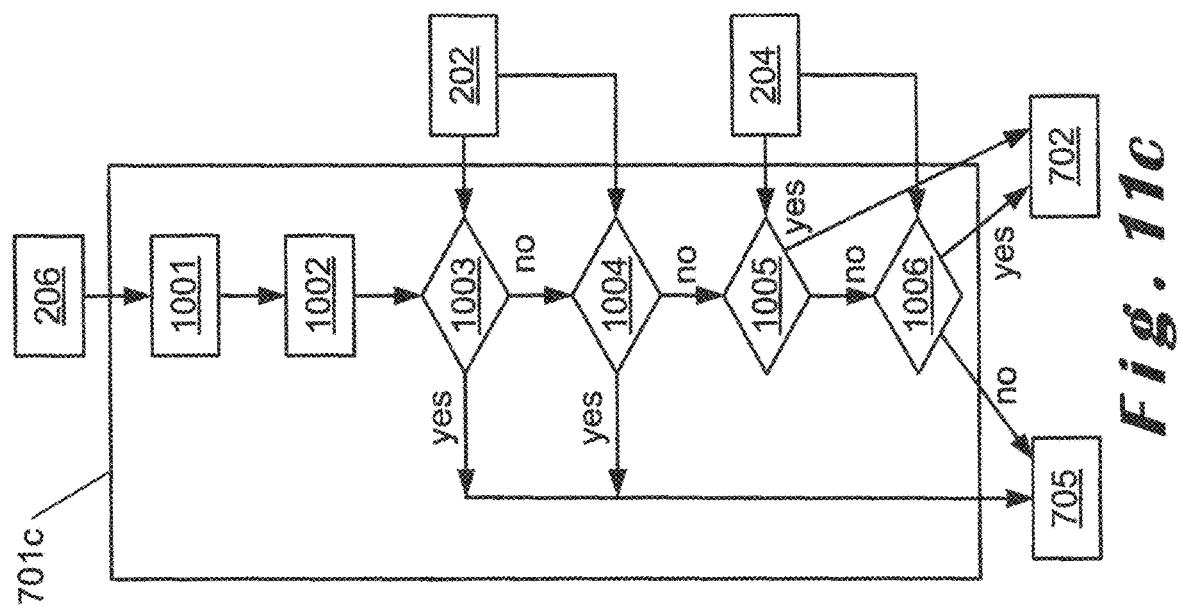

In a third embodiment of the check (step 701c) as shown in FIG. 11c, it is preferred that it is used if the value of a pixel in the current image 202 comprises an indication of the depth of the pixel and an indication of the colour thereof. Step 1003 determines if a depth boundary appears in the current image 202 at the position of the edge 1002. This step 1003 can be performed by computing the difference in depth values between pixels across the boundary in the current image 202. If the difference in depth values is higher than a predetermined threshold for substantially all pixels along the edge 1002, or for a predetermined percentage of the pixels thereof, it is considered that a depth boundary appears in the current image 202 at the position of the edge 1002. Then region 1001 is not a "ghost" region 705 as it is present in the current image 202.

Otherwise, a further step 1004 is performed to determine if a colour boundary appears in the current image 202 at the position of the edge 1002. This step 1004 can be performed by computing the difference in colour between pixels across the boundary in the current image 202. The difference in colour can be computed as a delta E, or, if pixels have black-and-white colour, the difference in colour can be 0 if pixels across the boundary are all black or all white. If the difference in colour values is higher than a predetermined threshold for substantially all pixels along the edge 1002, or for a predetermined percentage of the pixels thereof, it is considered that a colour boundary appears in the current image 202 at the position of the edge 1002. Then region 1001 is not a "ghost" region 705 as it is present in the current image 202.

A further step 1005 is performed to determine if a depth boundary appears in the first background image 204 at the position of the edge 1002. This step 1005 can be performed by computing the difference in depth values between pixels across the boundary in the first background image 204. If the difference in depth values is higher than a threshold for substantially all pixels of the edge 1002 or for a predetermined percentage of the pixels of the edge 1002, a depth boundary appears in the first background image 204 at the position of the edge 1002. In this case, the region 1001 is a "ghost" region 702.

Otherwise, a further step 1006 is performed to determine if a colour boundary appears in the first background image 204 at the position of the edge 1002. This step 1006 can be performed by computing the difference in colour values between pixels across the boundary in the first background image 204. If the computed difference in colour values is higher than a threshold for substantially all pixels of the edge 1002 or for a predetermined percentage of the pixels of the edge 1002, a colour boundary appears in the first background image 204 at the position of the edge 1002. In this case, the region 1001 is a "ghost" region 702 because it is not present in the current image 202 nor in the first background image 204.

If the check (step 1006) does not provide a difference in colour which is higher than the threshold, if no first background image 204 is available, or if the first background image 204 has no reliable colour information at the position of the edge 1002, the region 1001 is not a "ghost" region 705.

In a fourth embodiment of the check (step 701*d*) as shown in FIG. 11*d*, step 1007 computes the difference in colour between pixels across the boundary in the current image 202 which results in a difference 1008. A step 1009 computes the difference in colour between pixels across the boundary in the first background image 204 which results in a difference 1010. The difference 1008 in colour between pixels across the boundary in the current image and the difference 1010 in colour between pixels across the boundary in the first background image are compared at a comparison step 1011. If the difference is higher in the current image than in the first background image for a predetermined percentage of the edge 1002, the region 1001 is considered not to be a "ghost" region 705. Otherwise, the region 1001 is considered to be a "ghost" region 702.

The embodiment described with reference to FIG. 11*d* could be performed based on depth information instead of colour information, or based on both depth and colour information.

A part of the edge 1002 may be considered in the check described above with reference to FIGS. 11*a* to 11*d* instead of the full edge, for example, by considering only the edge 1002 between foreground regions and background regions, and not between either foreground regions and regions which are considered to be "unknown" or between background regions and regions which are considered to be "unknown".

The comparison check in step 701 as described above with reference to FIGS. 10 and 11*a* to 11*d* is repeated for each region 1001 of the preliminary background and foreground regions 206 of the current image 202.

Referring again to FIG. 10, if the check 701 has determined that a region is a "ghost" region 702, that region has to be re-classified by the re-classification step 703. In an embodiment of the present disclosure, the re-classification step 703 is applied in the following way:

if a "ghost" region is a region of foreground pixels, pixels of that region are re-classified as background, if a "ghost" region is a region of unknown pixels, pixels of that region are re-classified as background, and if a "ghost" region is a region of background pixels, pixels of that region are re-classified as "unknown".

In an alternative embodiment, if a "ghost" region is a region of background pixels, pixels of that region are re-classified as foreground.

It is also possible to apply the re-classification step 703 only to the foreground regions, only to the background regions or only to the "unknown" regions.

Optionally, the values in the first background image 204 of the pixels of the "ghost" regions 702 are then updated at step 704, which provides the background image 209.

The update of the background image 704 may, for example, be applied in the following way:

if a "ghost" region is a region of foreground pixels, pixels of that region are learnt in the background image 209, that is, the values of these pixels in the background image 209 are set to be equal to the values of the corresponding pixels in the current image 202, if a "ghost" region is a region of "unknown" pixels, pixels of that region are learnt in the background image 209, that is, the values of these pixels in the background image 209 are set to be equal to the values of the corresponding pixels in the current image 202, and if a "ghost" region is a region of background pixels, pixels of that region are cleared in the background image 209, that is, the values of the pixels in the background image 209 are set as being undetermined.

In another embodiment, the first background image 204 is not used in the region classification step 207, and there is therefore no need to update the background image at step 704.

Figure 12:
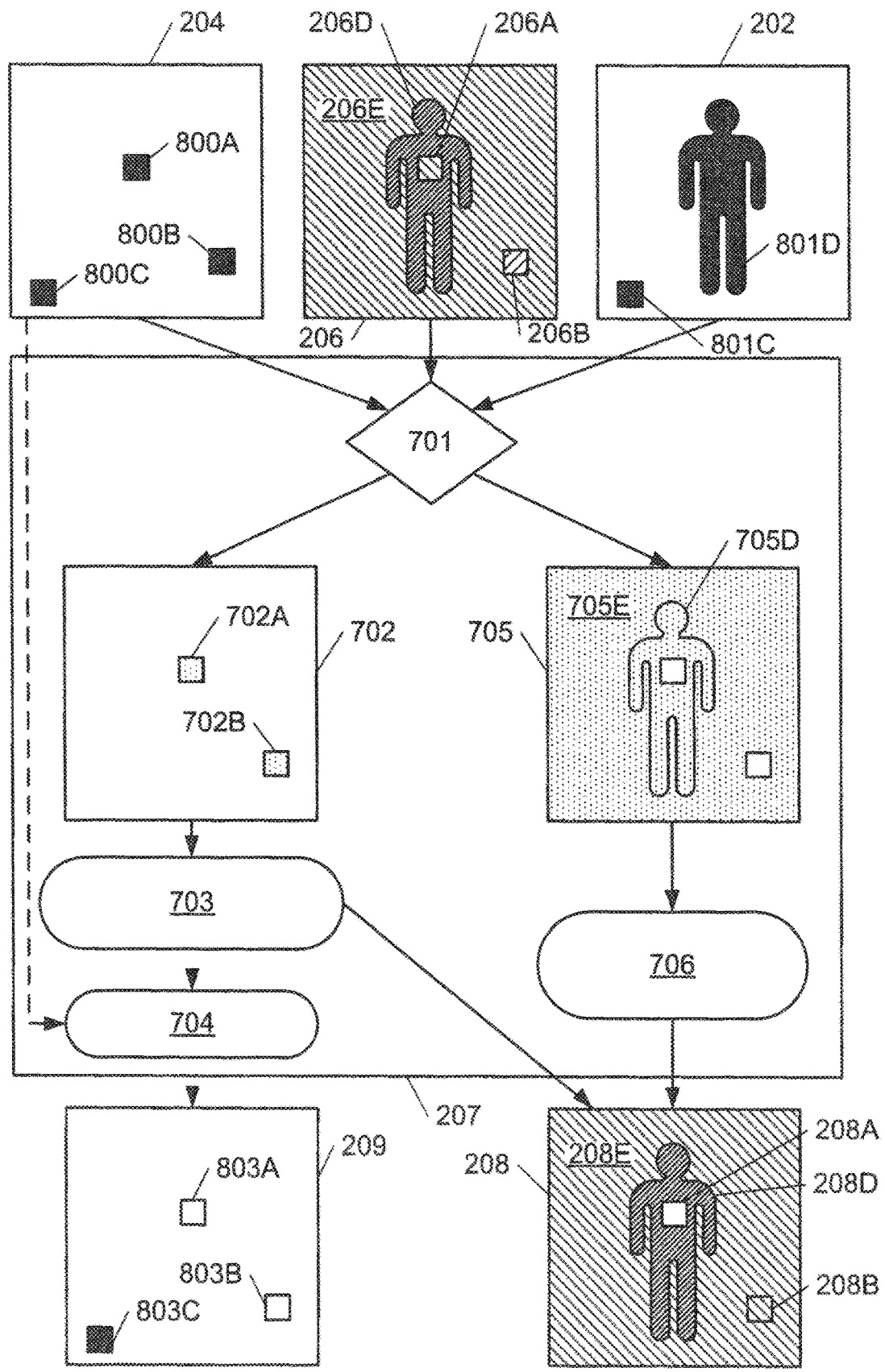
FIG. 12 illustrates a region classification according to an embodiment of the present disclosure.

An example of region classification process 207 as described above with reference to FIG. 10 is illustrated on FIG. 12. FIG. 12 can be seen as an illustration, step-by-step, of FIG. 10 and the boxes of both Figures are labelled identically. The initial background image 204, the preliminary background and foreground regions 206, and the current image 202 are used by the region classification 207 to generate the background 209 and the background and foreground regions 208.

As shown on the left-hand side, the first background image 204 is white except in three black rectangles 800A, 800B and 800C. For example, rectangle 800A may correspond to a dark frame on a wall, rectangle 800B may correspond to a learning error, and rectangle 800C may correspond to an object on the floor. As shown on the right-hand side, the current image 202 is white except for a black silhouette 801D corresponding to a user or person within the image and a black rectangle 801C corresponding to the object on the floor which is the same as rectangle 800C in the first background image 204 described above.

The preliminary background and foreground regions 206 are shown in the middle of the Figure. Pixels of region 206E are correctly classified as background and pixels of region 206D are correctly classified as foreground. The regions represented by rectangle 800C in the first background image 204 and rectangle 801C in the current image 202 are no longer visible. Pixels of region 206A are erroneously classified as background and pixels of region 206B are erroneously classified as foreground. The region classification process 207 is there to correct such errors in the classification of pixels into categories, by performing a correction per region of pixels of same category.

The check in step 701 is performed on the regions 206A, 206B, 206D and 206E, and considers that a region is a "ghost" region if the edge of that region corresponds to an edge in the first background image 204 and does not correspond to an edge in the current image 202. This is the case for the regions 206A and 206B.

Regions 206A and 206B are considered as "ghost" regions 702A and 702B in the box 702. At step 703, pixels of region 702A that were erroneously classified as background are re-classified as "unknown" 208A in the background and foreground regions 208. At step 704, these pixels are cleared in the background image 209, that is, the values of the pixels of 803A are set as undetermined in the background image 209, Pixels of the region 702B that were erroneously classified as foreground are re-classified as background 208B in the background and foreground regions 208. These pixels are learnt in the background image 209, that is, the values of the pixels of 803B in the background image 209 are set to be equal to the values of the same pixels in the current image 202. The pixels of 803C remain unchanged in the background image 209 with respect to the first background image 204 (800C).

Regions 206D and 206E are not considered to be ghosts 705A and 705D in the box 705. The category of the pixels of these regions remain unchanged at step 706. These regions become 208D and 208E in the background and foreground regions 208.

Returning now to FIG. 6, after the region classification step 207, which has resulted in the generation of background and foreground regions 208 and optionally the background image 209, the core processing step 2004 of the image 202 is finished, and, as described above with reference to FIG. 2, the post-processing 2005 of the image 202 can be performed. The post-processing step 2005 improves the characteristics of the current image 202 to make it more suitable for the further image processing 2006.

Figure 13:
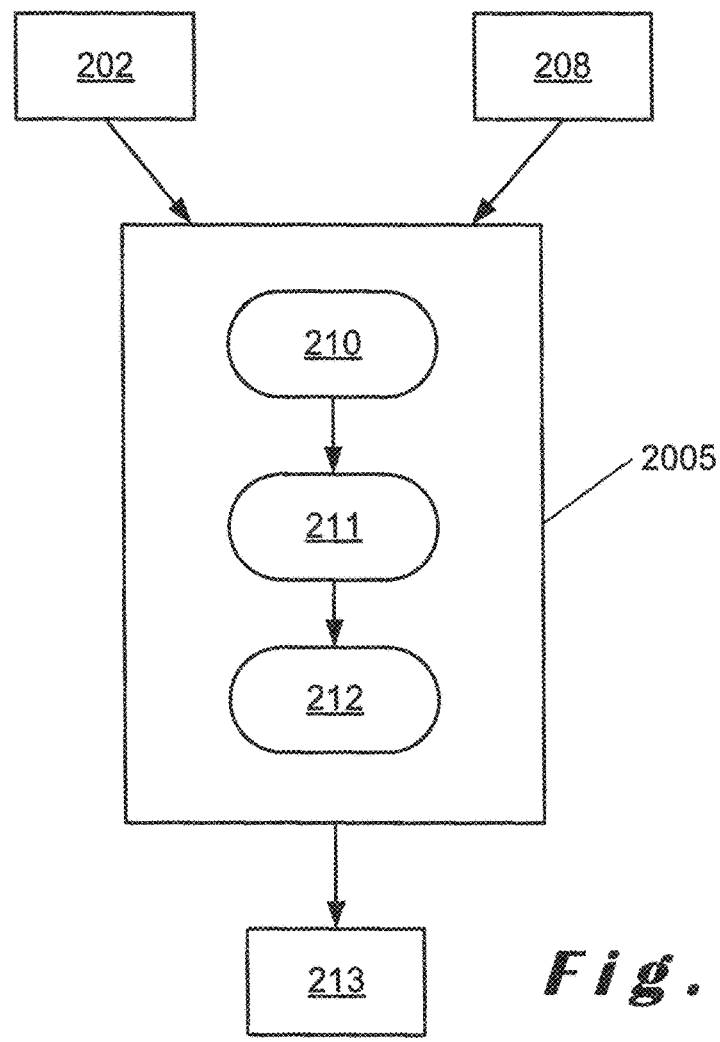
FIG. 13 illustrates a flowchart of a method for image processing according to an embodiment of the present disclosure.

The post-processing 2005 of the current image 202 according to an embodiment of the present disclosure is shown in FIG. 13. The post-processing step 2005 of the current image 202 also uses the background and foreground regions 208. A binarisation and noise filtering step 210 converts values of the pixels of the current image 202 from colour or grayscale to black-and-white and filters the noise. A smoothing step 211 smoothes the image. If the values of some of the pixels of the current image 202 indicates depth values, a depth hole filling step 212 is then applied to zones of pixels where the depth is undetermined. The result of the post-processing step 2005 of the image 202 is an updated image 213.

Several methods can be used for the binarisation and noise filtering step 210. One method utilises a median filter for noise filtering after binarisation. The median filter is especially appropriate because this noise filtering technique preserves edges while removing noise. Another method utilises a median filter for noise filtering before binarisation. The smoothing step 211 uses, in an embodiment of the present disclosure, a graph cut algorithm.

The depth hole filling step 212 is then applied to zones of pixels where the depth values are undetermined. The capture of the image may not be perfect, and the depth information may be missing for some zones of the image, even if the colour (or grayscale, or black-and-white) information can be captured and even if pixels can be classified into categories as described above. In such a case, pixels may have undetermined depth values. A zone of undetermined depth comprises pixels which have no depth information and are connected together in an image where other pixels have values containing depth information. The values of the pixels in a zone of undetermined depth may also contain no colour, grayscale or black-and-white information.

The depth of a zone of undetermined depth may be determined by an "inpainting" technique that uses the values of the pixels around and in the neighbourhood of the zone of undetermined depth to reconstruct the missing information, for example, by interpolation. Other methods of reconstructing the missing information are also possible.

"Inpainting" may be performed as follows:

If a zone of undetermined depth comprises pixels of a single category and if that zone is surrounded only by pixels of said single category, the depth of that zone is "inpainted" with an "inpainting" technique using only pixels of said single category.

If a zone of undetermined depth comprises pixels of a single category and if that zone is surrounded by pixels of several categories including the single category of the pixels of that zone, the depth of that zone is "inpainted" with an "inpainting" technique that uses only pixels of that single category corresponding to that category.

If a zone of undetermined depth comprises pixels of several categories and if that zone is surrounded by pixels of the same categories, the depth of the zone is "inpainted" with an "inpainting" technique that does not use interpolation between pixels of various categories, that is, pixels of a particular category are "inpainted" using only pixels of said category.

The "inpainting" technique is preferably a Total Variation "inpainting" technique using partial differential equations which does not use interpolation between pixels of various categories and which is mathematically translated by boundary conditions at the edge between categories to allow a discontinuity in the "inpainting" at the edge between categories. Total Variation "inpainting" is especially appropriate because it reconstructs edges rather than smoothing them like some other algorithms.

Figure 14:
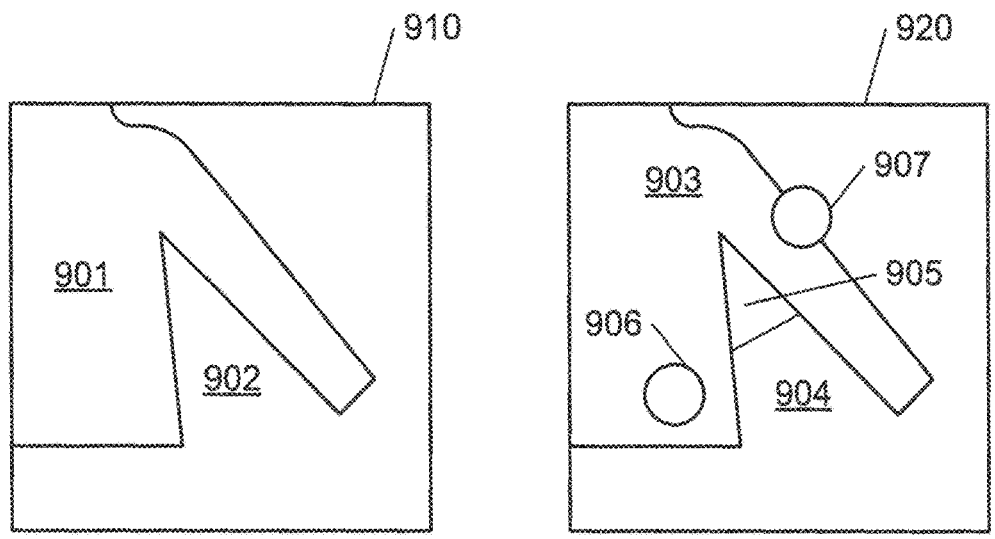
FIG. 14 illustrates a depth hole filling according to an embodiment of the present disclosure.

FIG. 14 illustrates the depth hole filling step 212 in more detail. The background and foreground regions 910 of the image being processed are shown where region 901 is a foreground region and region 902 is a background region. The depth values 920 of the pixels in the image being processed are shown where the depth is known in zones 903 and 904 and is undetermined in zones 905, 906 and 907.

Zone 906 appears to comprise only foreground pixels and is surrounded only by foreground pixels. Depth values for pixels in zone 906 are "inpainted" using only foreground pixels, for example, foreground pixels next or close to the edge of zone 906.

Zone 905 appears to comprise only background pixels and is surrounded by pixels of both foreground and background categories. Depth values for pixels in zone 905 are "inpainted" using only background pixels, for example, background pixels of zone 904 next or close to the edge of zone 905.

Zone 907 appears to comprise both background and foreground pixels and is surrounded by pixels of both foreground and background categories. Depth values for pixels in zone 907 are "inpainted" with a technique that does not interpolate between the foreground pixels (of zone 903) and the background pixels (of zone 904). Depth values of pixels belonging to the background category are "inpainted" using only background pixels and depth of pixels belonging to the foreground category are inpainted using only foreground pixels.

Although the specific embodiments of the present disclosure have been described above, it will readily be understood that the disclosure is not limited to such embodiments.

Note that the present technology can also be configured as described below.

(1) A method for image processing at least one image captured by an imaging system, the method including the steps of:

a) classifying pixels of each image into one of at least two categories, each pixel including at least one of: depth information and colour information relating to said at least one image;

b) assigning pixels belonging to the same category to at least one region;
c) verifying, for each region, that the category of its pixels is correct; and
d) re-classifying each incorrectly classified pixel by changing its category.

(2) A method according to (1), wherein said at least two categories includes a foreground category and a background category which respectively correspond to the foreground and the background of said at least one image.

(3) A method according to (2), wherein each region corresponds to a portion of one of the foreground and the background of said at least one image.

(4) A method according to any one of (1) to (3), wherein said at least two categories further includes an unknown category.

(5) A method according to (4), wherein step d) includes re-classifying pixels from one of: a foreground category to a background category; a background category to a foreground category; an unknown category to a background category; and a background category to an unknown category.

(6) A method according to any one of (1) to (5), wherein step c) includes determining the category of pixels in a region is correct if an edge of said region corresponds to an edge in said at least one image for at least a predetermined percentage thereof.

(7) A method according to any one of (1) to (5), wherein step c) includes determining the category of the pixels of a region is incorrect if an edge of a region does not correspond to an edge in said at least one image for at least for a predetermined percentage thereof.

(8) A method according to any one of (1) to (7), further including using steps c) and d) to update at least one portion of an image.

(9) A method according to any one of (1) to (8), further including the step of e) determining a background image, and wherein steps c) and d) are used to update at least one portion of the background image.

(10) A method according to (8), wherein step c) includes determining the category of the pixels of a region is incorrect if an edge of a region does not correspond to an edge in said at least one image for at least a predetermined percentage thereof, and, if said edge of said region corresponds to an edge in the background image for at least a predetermined percentage thereof.

(11) A method according to (9), wherein step c) includes determining the category of the pixels of a region is correct if at least one of the differences in colour and in depth between pixels across an edge of said region is higher in said at least one image than in the background image for at least a predetermined percentage of said edge.

(12) A method according to any one of (8) to (11), wherein step e) includes the steps of:
e1) for each pixel, determining an absolute value of the difference of depth between a previously captured image and said at least one image is higher than a threshold; and
e2) providing a value for each pixel in said background image.

(13) A method according to (12), wherein step e2) sets the value of said pixel in said background image to be equal to the value of said pixel in the previous image if the depth of said pixel is not higher in said at least one image than in said previously captured image.

(14) A method according to (11), wherein step e2) sets the value of said pixel in said background image to be equal to the value of said pixel in said at least one image if the depth of said pixel is higher in said at least one image than in said previously captured image.

(15) A method according to any one of (8) to (14), further including the step of storing the updated background image for comparison with at least one subsequent image captured by the imaging system.

(16) A method according to any of one of (1) to (15), wherein step a) includes:
a1) for each pixel including depth information, determining an absolute value of the difference of depth between a previously captured image and said at least one image is higher than a thresZhold;
a2) for pixels where the absolute value of the difference is higher than the threshold, comparing the depth of said pixel in said at least one image with said previously captured image;
a3) if the depth of said pixel is greater in said at least one image than in said previously captured image, classifying said pixel as background; and
a4) if the depth of said pixel is lower in said at least one image than in said previously captured image, classifying said pixel as foreground.

(17) A method according to any one of (1) to (16), further including the steps of:
f) determining at least one zone including pixels having indeterminate depth values; and
g) assigning a depth value for each pixel in said at least one zone.

(18) A method according to (17), wherein step g) includes using only valid depth values from pixels of the same category.

(19) A non-transitory computer readable medium storing a program for causing a computer to execute the steps of the method according to any one of (1) to (18).

(20) An interactive computerised system including:
an imaging system configured to capture at least one image of a scene within its frustum;
a gesture recognition system configured to capture gestures performed by a user within the frustum of the imaging system; and
a computerised system associated with the imaging system and with the gesture recognition system, the computerised system including at least one processor for processing each captured image of the scene in accordance with the steps according to any one of (1) to (19) and configured to process captured gestures performed by a user within frustum of the imaging system.

(21) A system according to (20), wherein the imaging system includes a three-dimensional imaging system.

(22) A system according to (21), wherein the three-dimensional imaging system includes a depth sensing imaging system.

(23) A system according to (21), wherein the imaging system includes a colour imaging system with depth sensing.

KEY TO THE DRAWINGS (IN NUMERICAL ORDER)

200: video sequence
201: previous image
202: current image
202F: following image
204: first background image
205: pixel-wise classification
206: preliminary background and foreground regions 207: region classification
208: background and foreground regions
208F: background and foreground regions of the following image
209: background image
209F: background and foreground regions of the following image
209P: previously determined background image
210: binarisation and noise filtering step
211: smoothing step
212: depth hole filling step
213: updated image
213F: updated image of the following image
301: value of a pixel in the previous image
302: value of a pixel in the current image
303: first test step
304: second test step
305: de-occlusion
306: learning of the value of the pixel in the current image
307: occlusion
308: learning of the value of the pixel in the previous image
309: value of a pixel in the first background image
310: determination of the value in the first background image of a pixel where no occlusion/de-occlusion was detected
601: value of a pixel in the first background image
603: comparison step
701: test in the region classification
702: "ghost" region
703: re-classification or category change step
704: step of update of the values in the background image of the pixels of the ghost regions
705: a region which is not considered to be a "ghost" region
706: category keep step
1001: considered region of the preliminary background and foreground regions
1002: edge of the considered region
1003: step that determines if a depth boundary appears in the current image at the position of the edge
1004: step that determines if a colour boundary appears in the current image at the position of the edge
1005: step that determines if a depth boundary appears in the first background image at the position of the edge
1006: step that determines if a colour boundary appears in the first background image at the position of the edge
1007: step that computes the difference in colour between pixels across the boundary in the current image
1008: difference in colour between pixels across the boundary in the current image
1009: step that computes the difference in colour between pixels across the boundary in the first background image
1010: difference in colour between pixels across the boundary in the first background image
1011: comparison between the difference in colour between pixels across the boundary in the current image and the difference in colour between pixels across the boundary in the first background image
2001: capture of an image by the imaging system
2002: analysing step
2002F: analysing step of the following image
2003: image pre-processing step
2004: image core processing step
2005: image post-processing step
2006: further image processing
2007: pixel-wise learning
6001: background pixel
6002: foreground pixel
6003: unknown pixel

The invention claimed is:

1. A method for processing an image comprising a plurality of pixels, the method comprising:
   a) classifying each pixel of the plurality of pixels as belonging to one of at least two categories based on a pixel information value associated with the pixel, wherein the pixel information value includes a depth information value and/or a colour information value;
   b) defining a region of pixels within the image by including in the region only pixels belonging to a same category and being connected to at least one other pixel in the region, the region being associated with the same category associated with the pixels included in the region;
   c) determining, for the region, whether the category associated with the region is correct; and
   d) re-classifying the pixels included in the region to a different one of the at least two categories when it is determined that the category associated with the region is not correct.

2. A method according to claim 1, wherein the at least two categories comprises a foreground category and a background category which respectively correspond to a foreground and a background of the image.

3. A method according to claim 2, wherein the region corresponds to a portion of one of the foreground and the background of the image.

4. A method according to claim 2, wherein the at least two categories further comprises an unknown category.

5. A method according to claim 4, wherein re-classifying the pixels comprises re-classifying the pixels from one of: the foreground category to the background category; the background category to the foreground category; the unknown category to the background category; and the background category to the unknown category.

6. A method according to claim 1, wherein determining that the category associated with the region is correct comprises determining whether a boundary of the region corresponds to a boundary in the image for at least a predetermined percentage of pixels associated with the boundary of the region.

7. A method according to claim 1, wherein determining whether the category associated with the region is correct comprises determining whether a boundary of the region does not correspond to a boundary in the image for at least a predetermined percentage of pixels associated with the boundary of the region.

8. A method according to claim 1, further comprising using steps c) and d) to update at least one portion of an image.

9. A method according to claim 1, further comprising:
   e) determining a background image, and wherein steps c) and d) are used to update at least one portion of the background image.

10. A method according to claim 9, wherein determining whether the category associated with the region is correct comprises determining whether a boundary of the region does not correspond to a boundary in the image for at least a predetermined percentage of pixels associated with the boundary of the region, and, determining whether the boundary of the region corresponds to a boundary in the background image for at least a predetermined percentage of pixels associated with the boundary of the region.

11. A method according to claim 9, wherein determining whether the category associated with the region is correct comprises determining whether at least one of a difference in colour and/or in depth between pixels across a boundary of the region is higher for the image than for the background image for at least a predetermined percentage of pixels associated with the boundary of the region.

12. A method according to claim 9, wherein determining the background image comprises:
   e1) for each pixel, determining whether an absolute value of a difference between a depth information value associated with a pixel of a previously captured image and a depth information value associated with a corresponding pixel of the image is greater than a threshold difference value; and
   e2) providing a new depth information value for a corresponding pixel in the background image based on the determination that the absolute value of the difference is greater than the threshold difference value for the pixel.

13. A method according to claim 12, wherein providing the new depth information value comprises setting the depth information value of the corresponding pixel in the background image to be equal to the depth information value of the pixel in the previously captured image if the depth information value of the pixel of the previously captured image is not greater than the depth information value of the corresponding pixel of the image.

14. A method according to claim 12, wherein providing the new depth information value comprises setting the depth information value of the corresponding pixel in the background image to be equal to the depth information value of the corresponding pixel in the image if the depth information value of the pixel of the previously captured image is greater than the depth information value of the corresponding pixel of the image.

15. A method according to claim 9, further comprising storing an updated background image for comparison with at least one subsequently captured image.

16. A method according to claim 1, wherein classifying each pixel of the plurality of pixels comprises:
   a1) for each pixel comprising a pixel information value including a depth information value, determining whether an absolute value of a difference between a depth information value of a corresponding pixel of a previously captured image and a pixel of the image is greater than a threshold difference value;
   a2) for pixels having an absolute value that is greater than the threshold difference value, comparing the depth information value of the pixel of the image with the depth information value of the corresponding pixel of the previously captured image;
   a3) classifying the pixel of the image as belonging to a background category if the depth information value of the pixel is greater in the image than the depth information value of the corresponding pixel in the previously captured image; and
   a4) classifying the pixel of the image as belonging to a foreground category if the depth information value of the pixel is lower in the image than the depth information value of the corresponding pixel in the previously captured image.

17. A method according to claim 1, further comprising:
   f) determining at least one zone comprising pixels having indeterminate depth information values; and
   g) assigning a depth information value to each pixel in the at least one zone.

18. A method according to claim 17, wherein assigning the depth information value comprises using only valid depth information values from pixels belonging to the same category.

19. A non-transitory computer readable medium configured to store a program that, when executed cause a computer to perform a method comprising:
   a) classifying each pixel of a plurality of pixels of an image as belonging to one of at least two categories based on a pixel information value associated with the pixel, wherein the pixel information value includes a depth information value and/or a colour information value;
   b) defining a region of pixels within the image by including in the region only pixels belonging to a same category and being connected to at least one other pixel in the region, the region being associated with the same category associated with the pixels included in the region;
   c) determining, for the region, whether the category associated with the region is correct; and
   d) re-classifying the pixels included in the region to a different one of the at least two categories when it is determined that the category associated with the region is not correct.

20. An interactive computerised system comprising:
an imaging system configured to capture an image of a scene within its frustum;
a gesture recognition system configured to capture gestures performed by a user within the frustum of the imaging system; and
a computerised system associated with the imaging system and with the gesture recognition system, the computerised system including at least one processor for processing each captured image of the scene and configured to process captured gestures performed by a user within frustum of the imaging system, wherein processing each captured image of the scene comprises:
   a) classifying each pixel of a plurality of pixels of the image as belonging to one of at least two categories based on a pixel information value associated with the pixel, wherein the pixel information value includes a depth information value and/or a colour information value;
   b) defining a region of pixels within the image by including in the region only pixels belonging to a same category and being connected to at least one other pixel in the region, the region being associated with the same category associated with the pixels included in the region;
   c) determining, for the region, whether the category associated with the region is correct; and
   d) re-classifying the pixels included in the region to a different one of the at least two categories when it is determined that the category associated with the region is not correct.

* * * * *